(12) United States Patent
Takashima et al.

(10) Patent No.: US 12,542,865 B2
(45) Date of Patent: Feb. 3, 2026

(54) COMMUNICATION DEVICE AND CONTROL DEVICE

(71) Applicant: Panasonic Intellectual Property Management Co., Ltd., Osaka (JP)

(72) Inventors: Toru Takashima, Osaka (JP); Masaya Fujimoto, Osaka (JP); Kengo Yasumura, Osaka (JP); Reo Yamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 46 days.

(21) Appl. No.: 18/391,749

(22) Filed: Dec. 21, 2023

(65) Prior Publication Data

US 2024/0214516 A1    Jun. 27, 2024

(30) Foreign Application Priority Data

Dec. 26, 2022    (JP) .................................. 2022-208349

(51) Int. Cl.
*H04N 5/765* (2006.01)

(52) U.S. Cl.
CPC ..... *H04N 5/765* (2013.01); *H04N 2201/0015* (2013.01); *H04N 2201/3278* (2013.01)

(58) Field of Classification Search
CPC ........... H04N 5/765; H04N 2201/0015; H04N 2201/3278
See application file for complete search history.

(56) References Cited

U.S. PATENT DOCUMENTS

| 9,690,531 | B2 * | 6/2017 | Kawaura | ............... G06F 3/1285 |
| 9,712,641 | B2 * | 7/2017 | Asano | ....................... G06F 3/12 |
| 2002/0063781 | A1 | 5/2002 | Aizawa | |
| 2015/0077577 | A1 * | 3/2015 | Terashita | ............. H04N 23/661 348/207.11 |
| 2018/0109722 | A1 * | 4/2018 | Laroia | .................... H04N 5/772 |

FOREIGN PATENT DOCUMENTS

JP    2002-133406 A    5/2002

* cited by examiner

*Primary Examiner* — Thai Q Tran
*Assistant Examiner* — Jose M Mesa
(74) *Attorney, Agent, or Firm* — Renner, Otto, Boisselle & Sklar, LLP

(57) ABSTRACT

A communication device configured to notify an external control device of information managed in the communication device, the communication device including: a communication circuitry configured to perform data communication with the control device; and a control circuitry configured to generate notification data in response to an event and control the communication circuitry to transmit the notification data to the control device, the event indicating that a state in the communication device changes, wherein the notification data includes: an event identification region to identify a target event to be notified, a data storage region to store state data indicating a state changed in the target event, and a necessity identification region to indicate whether the control device requires acquiring additional information regarding the target event.

8 Claims, 19 Drawing Sheets

| ISO VALUE | AVAILABILITY FLAG | ISO SENSITIVITY STEP | |
|---|---|---|---|
| | | 1/3EV | 1EV |
| Auto | 1 | ○ | ○ |
| 100 | 1 | ○ | ○ |
| 125 | 1 | ○ | |
| 160 | 1 | ○ | |
| 200 | 1 | ○ | ○ |
| 250 | 1 | ○ | |
| 320 | 1 | ○ | |
| 400 | 1 | ○ | ○ |
| 500 | 1 | ○ | |
| 640 | 1 | ○ | |
| 800 | 1 | ○ | ○ |
| ... | ... | ... | ... |

COPY →

T10

| ISO VALUE | AVAILABILITY FLAG |
|---|---|
| Auto | 1 |
| 100 | 1 |
| 125 | 1 |
| 160 | 1 |
| 200 | 1 |
| 250 | 1 |
| 320 | 1 |
| 400 | 1 |
| 500 | 1 |
| 640 | 1 |
| 800 | 1 |
| ... | ... |

Fig. 13

| ADJUSTMENT ITEM | PHOTO SYTLE | | | | | |
|---|---|---|---|---|---|---|
| | STANDARD | VIVID | NATURAL | MONOCHROME LIKE | CINE LIKE | 709 LIKE | V-Log |
| CONTRAST | ○±5 | ○±5 | ○±5 | ○±5 | ○±5 | - | - |
| HIGHLIGHT | ○±5 | ○±5 | ○±5 | ○±5 | ○±5 | - | - |
| SHADOW | ○±5 | ○±5 | ○±5 | ○±5 | ○±5 | - | - |
| SATURATION | ○±5 | ○±5 | ○±5 | - | ○±5 | ○±5 | - |
| HUE | ○±5 | ○±5 | ○±5 | ○±5 | ○±5 | ○±5 | - |
| SHARPNESS | ○±5 | ○±5 | ○±5 | ○±5 | ○±5 | ○±5 | ○0~10 |
| NOISE REDUCTION | ○±5 | ○±5 | ○±5 | ○±5 | ○±5 | ○±5 | ○0~10 |
| FILTER EFFECT | - | - | - | ○ (OFF/YL/OR/RD/GN) | - | - | - |
| KNEE SETTING | - | - | - | - | - | ○ (OFF/AUTO/MANUAL) | - |

Fig. 14

T11: PATTERN 1 FOR ADJUSTMENT ITEM

| VALUE | AVAILABILITY FLAG |
|---|---|
| -5 | 1 |
| -4.5 | 1 |
| -4 | 1 |
| -3.5 | 1 |
| -3 | 1 |
| -2.5 | 1 |
| -2 | 1 |
| -1.5 | 1 |
| -1 | 1 |
| -0.5 | 1 |
| 0 | 1 |
| 0.5 | 1 |
| 1 | 1 |
| 1.5 | 1 |
| 2 | 1 |
| 2.5 | 1 |
| 3 | 1 |
| 3.5 | 1 |
| 4 | 1 |
| 4.5 | 1 |
| 5 | 1 |

CHANGE PHOTO STYLE FROM STANDARD TO V-log ⇒

T12: PATTERN 1 FOR ADJUSTMENT ITEM

| VALUE | AVAILABILITY FLAG |
|---|---|
| -5 | 0 |
| -4.5 | 0 |
| -4 | 0 |
| -3.5 | 0 |
| -3 | 0 |
| -2.5 | 0 |
| -2 | 0 |
| -1.5 | 0 |
| -1 | 0 |
| -0.5 | 0 |
| 0 | 0 |
| 0.5 | 0 |
| 1 | 0 |
| 1.5 | 0 |
| 2 | 0 |
| 2.5 | 0 |
| 3 | 0 |
| 3.5 | 0 |
| 4 | 0 |
| 4.5 | 0 |
| 5 | 0 |

*Fig. 15*

| PATTERN 2 FOR ADJUSTMENT ITEM T21 | |
|---|---|
| VALUE | AVAILABILITY FLAG |
| -5 | 1 |
| -4.5 | 1 |
| -4 | 1 |
| -3.5 | 1 |
| -3 | 1 |
| -2.5 | 1 |
| -2 | 1 |
| -1.5 | 1 |
| -1 | 1 |
| -0.5 | 1 |
| 0 | 1 |
| 0.5 | 1 |
| 1 | 1 |
| 1.5 | 1 |
| 2 | 1 |
| 2.5 | 1 |
| 3 | 1 |
| 3.5 | 1 |
| 4 | 1 |
| 4.5 | 1 |
| 5 | 1 |
| 5.5 | 0 |
| 6 | 0 |
| 6.5 | 0 |
| 7 | 0 |
| 7.5 | 0 |
| 8 | 0 |
| 8.5 | 0 |
| 9 | 0 |
| 9.5 | 0 |
| 10 | 0 |

CHANGE PHOTO STYLE FROM STANDARD TO V-log ⇒

| PATTERN 2 FOR ADJUSTMENT ITEM T22 | |
|---|---|
| VALUE | AVAILABILITY FLAG |
| -5 | 0 |
| -4.5 | 0 |
| -4 | 0 |
| -3.5 | 0 |
| -3 | 0 |
| -2.5 | 0 |
| -2 | 0 |
| -1.5 | 0 |
| -1 | 0 |
| -0.5 | 0 |
| 0 | 1 |
| 0.5 | 1 |
| 1 | 1 |
| 1.5 | 1 |
| 2 | 1 |
| 2.5 | 1 |
| 3 | 1 |
| 3.5 | 1 |
| 4 | 1 |
| 4.5 | 1 |
| 5 | 1 |
| 5.5 | 1 |
| 6 | 1 |
| 6.5 | 1 |
| 7 | 1 |
| 7.5 | 1 |
| 8 | 1 |
| 8.5 | 1 |
| 9 | 1 |
| 9.5 | 1 |
| 10 | 1 |

Fig. 16

| MP4 | MOV | ProRes |
|---|---|---|
| IMAGE QUALITY SETTING (8 TYPES) | IMAGE QUALITY SETTING (58 TYPES) | IMAGE QUALITY SETTING (16 TYPES) |
| 4K/10bit/100M/60P | 5.8K/30P/420/10-L | 5.7K/30P/422/HQ |
| 4K/10bit/72M/30P | 5.8K/24P/420/10-L | 5.7K/30P/422/10 |
| 4K/8bit/100M/30P | 5.7K/60P/420/10-L | 5.7K/24P/422/10HQ |
| 4K/10bit/72M/24P | 5.7K/48P/420/10-L | 5.7K/24P/422/10 |
| 4K/8bit/100M/24P | 5.7K/30P/420/10-L | C4K/60P/422/10HQ |
| FHD/8bit/28M/60P | 5.7K/24P/420/10-L | C4K/60P/422/10 |
| FHD/8bit/20M/30P | 4.4K/60P/420/10-L | C4K/30P/422/10HQ |
| FHD/8bit/24M/24P | 4.4K/48P/420/10-L | C4K/30P/422/10 |
|  | C4K/120P/420/10-L | C4K/24P/422/10HQ |
|  | C4K/60P/422/10-I(800M) | C4K/24P/422/10 |
|  | C4K/60P/422/10-I(600M) | FHD/60P/422/10HQ |
|  | C4K/60P/422/10-L | FHD/60P/422/10 |
|  | C4K/60P/420/10-L | FHD/30P/422/10HQ |
|  | C4K/48P/422/10-I(800) | FHD/30P/422/10 |
|  | C4K/48P/422/10-I(600) | FHD/24P/422/10HQ |
|  | ... | FHD/24P/422/10 |

T31 — MP4  
T32 — MOV  
T33 — ProRes  
145

COMMUNICATION DEVICE AND CONTROL DEVICE

TECHNICAL FIELD

The present disclosure relates to a communication device and a control device capable of performing data communication with each other.

BACKGROUND ART

JP 2002-133406 A discloses a digital camera system in which a digital camera and a personal computer (PC) are connected. The digital camera system is configured so that the subsequent processing flow of the application software in the PC is the same whether the operation is initiated on the PC or on the digital camera side. To that end, in JP 2002-133406 A, when information in the digital camera is changed, an event is issued from the digital camera to the PC. For example, a predetermined event with a parameter indicating the parameter which has been changed, indicating a change to the capture setting in the digital camera, is transmitted to the PC.

SUMMARY

The present disclosure provides a communication device and a control device which can reduce a processing load in data communication for notifying a change in a state of the communication device to the control device.

A communication device according to an aspect of the present disclosure notifies an external control device of information managed in the communication device. The communication device includes: a communication circuitry configured to perform data communication with the control device; and a control circuitry configured to generate notification data in response to an event and control the communication circuitry to transmit the notification data to the control device, the event indicating that a state in the communication device changes. The notification data includes: an event identification region to identify a target event to be notified, a data storage region to store state data indicating a state changed in the target event, and a necessity identification region to indicate whether the control device requires acquiring additional information regarding the target event.

A control device according to one aspect of the present disclosure is notified of information from an external communication device. The control device includes: a communication circuitry configured to perform data communication with the communication device; and a control circuitry configured to control an operation to receive notification data from the communication device via the communication circuitry in response to an event indicating that a state in the communication device changes. The notification data includes an event identification region to identify a target event to be notified, a data storage region to store state data indicating a state changed in the target event, and a necessity identification region to indicate whether the control device requires acquiring additional information regarding the target event. When receiving, from the communication device via the communication circuitry, the notification data with the necessity identification region indicating that the control device requires acquiring the additional information, the control circuitry requests the additional information from the communication device. When receiving, via the communication circuitry, the notification data with the necessity identification region indicating that the control device does not require acquiring the additional information, the control circuitry does not request the additional information from the communication device.

According to the communication device and the control device of the present disclosure, it is possible to reduce a processing load in data communication for notifying the control device of a change in the state of the communication device.

BRIEF DESCRIPTION OF DRAWINGS

FIGS. 11A and 11B are diagrams for illustrating initialization of a setting value and a table for sharing in the digital camera;

FIG. 13 is a diagram for illustrating a camera state to be notified in the imaging system of a second embodiment;

FIG. 14 is a diagram for illustrating a first modification of a selectable value table in the second embodiment;

FIG. 15 is a diagram for illustrating a second modification of a selectable value table in the second embodiment; and FIG. 16 is a diagram for illustrating other selectable value tables in the second embodiment.

DETAILED DESCRIPTION

Hereinafter, embodiments will be described in detail with reference to the drawings as appropriate. However, detailed descriptions more than necessary will be omitted in some cases. For example, detailed descriptions of already well-known matters and duplicate descriptions for substantially the same configuration will be omitted in some cases. A reason thereof is to avoid unnecessary redundancy of the following description and to facilitate the understanding of those skilled in the art. Note that the inventor(s) provides the accompanying drawings and the following description in order for those skilled in the art to fully understand the present disclosure, and does not intend to limit the subject described in the claims by these.

First Embodiment

In a first embodiment, an imaging system including a communication device and a control device of the present disclosure will be described.

1. Configuration

Figure 1:
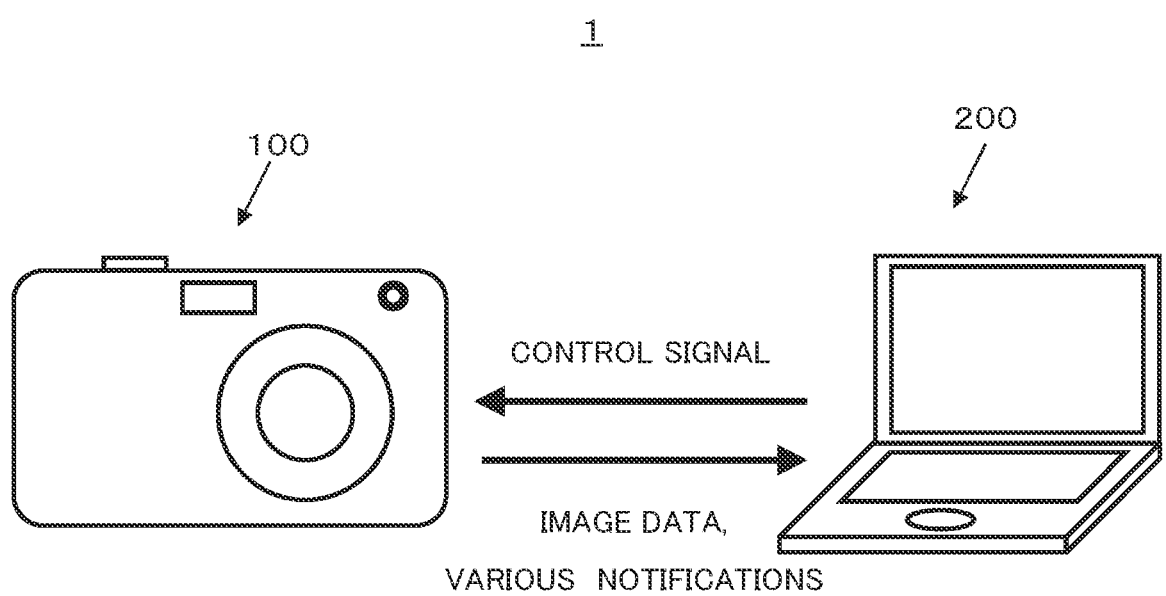
FIG. 1 is a diagram for illustrating a configuration of an imaging system in a first embodiment of the present disclosure.

FIG. 1 is a diagram for explaining a configuration of an imaging system 1 according to a first embodiment of the present disclosure. The imaging system 1 in FIG. 1 includes a digital camera 100 as an example of the communication device and a personal computer (PC) 200 as an example of the control device.

The imaging system 1 is configured to enable data communication between the digital camera 100 and the PC 200 in a protocol for image transfer such as a picture transfer protocol (hereinafter abbreviated as "PTP"). For example, through data communication between the digital camera 100 and the PC 200, the digital camera 100 can transfer an image captured during shooting to the PC 200 in real time and perform live view display on the PC 200. The live view (hereinafter abbreviated as "LV") is a function displaying, as a real-time moving image or the like, an image captured by the digital camera 100.

In the present system 1, for example, notifications regarding various states in the digital camera 100 (hereinafter each referred to as a "camera state") are transmitted from the digital camera 100 to the PC 200. The PC 200 is configured to perform various controls on the camera state to be notified. For example, the PC 200 issues a control signal related to data communication with the digital camera 100. A control signal for remote control may be transmitted from the PC 200 to the digital camera 100. In this case, the digital camera 100 can be remotely operated from the PC 200.

The configurations of the digital camera 100 and the PC 200 will be described below with reference to FIGS. 2 and 3.

1-1. Configuration of Digital Camera

Figure 2:
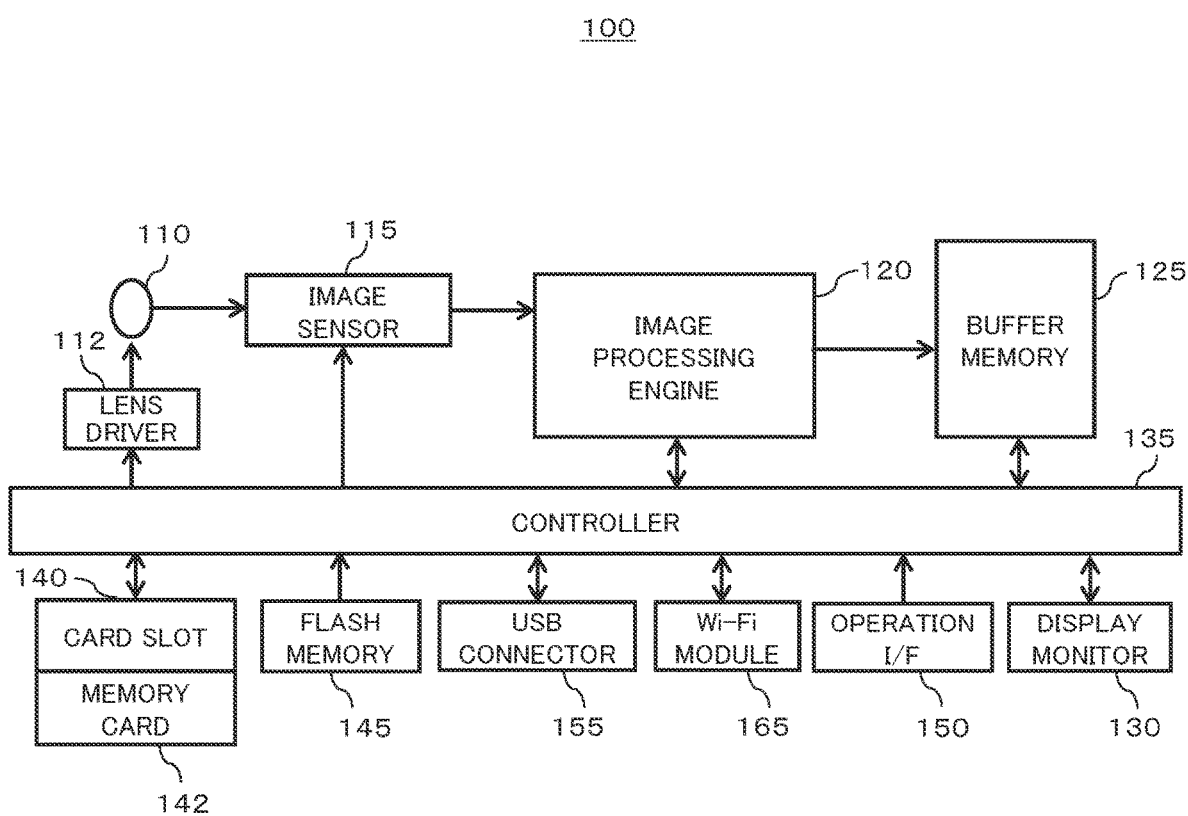
FIG. 2 is a block diagram illustrating a configuration of a digital camera in the imaging system.

FIG. 2 is a diagram illustrating a configuration of the digital camera 100 according to the present embodiment. The digital camera 100 of the present embodiment includes an image sensor 115, an image processing engine 120, a display monitor 130, and a controller 135. Further, the digital camera 100 includes a buffer memory 125, a card slot 140, a flash memory 145, an operation interface 150, a USB connector 155, and a Wi-Fi module 165. In addition, the digital camera 100 includes an optical system 110 and a lens driver 112, for example.

The optical system 110 includes a focus lens, a zoom lens, an optical image stabilization lens (OIS), an aperture, a shutter, and the like. The focus lens is a lens configured to change a focus state of a subject image formed on the image sensor 115. The zoom lens is a lens configured to change the magnification of the subject image formed by the optical system. Each of the focus lens and the like is configured using one or a plurality of lenses.

The lens driver 112 drives the focus lens and the like in the optical system 110. The lens driver 112 includes a motor and moves the focus lens along an optical axis of the optical system 110 under the control by the controller 135. A configuration for driving the focus lens in the lens driver 112 can be implemented with a DC motor, a stepping motor, a servo motor, an ultrasonic motor, or the like. The lens driver 112 includes an aperture actuator that drives the aperture in the optical system 110 under the control by the controller 135.

The image sensor 115 captures the subject image formed via the optical system 110 to generate imaging data. The imaging data is image data indicating an image captured by the image sensor 115. The image sensor 115 generates image data of a new frame at a predetermined frame rate (e.g., 30 frames/second). The generation timing of imaging data and an electronic shutter operation of the image sensor 115 are controlled by the controller 135. As the image sensor 115, various image sensors, such as a CMOS image sensor, a CCD image sensor, and an NMOS image sensor, can be used.

The image sensor 115 performs an imaging operation or the like of a moving image, a still image, or an LV image used for LV display. The LV image is mainly a moving image, and is displayed on the display monitor 130 for a user to determine a composition for capturing a still image, for example. The image sensor 115 performs various operations such as exposure and electronic shutter.

The image processing engine 120 performs various types of processing on imaging data output from the image sensor 115 to generate image data or performs various types of processing on image data to generate an image to be displayed on the display monitor 130. Examples of the various types of processing include white balance correction, gamma correction, YC conversion processing, electronic zoom processing, compression processing, decompression processing, and the like, but are not limited thereto. The image processing engine 120 may be configured using a hard-wired electronic circuit, or may be configured using a microcomputer, a processor, or the like using a program.

The display monitor 130 is an example of a display that displays various types of information. For example, the display monitor 130 displays an image (LV image or the like) indicated by image data captured by the image sensor 115 and subjected to image processing by the image processing engine 120. In addition, the display monitor 130 displays a menu screen or the like for a user to make various settings in the digital camera 100. The display monitor 130 can be configured using a liquid crystal display device or an organic EL device, for example.

The operation I/F 150 is a general term for hard keys and soft keys, such as an operation button and an operation dial provided on the exterior of the digital camera 100, and receives a user operation. For example, the operation I/F 150 includes a release button, a mode dial, a touch panel of the display monitor 130, a joystick, and the like. When receiving the user operation, the operation I/F 150 transmits an operation signal corresponding to the user operation to the controller 135.

The controller 135 is a hardware controller and comprehensively controls the operation of the entire digital camera 100. The controller 135 includes a CPU and the like, and the CPU realizes a predetermined function by executing a program (software). The controller 135 may, in place of the CPU, include a processor configured using a dedicated electronic circuit designed to realize a predetermined function. That is, the controller 135 can be implemented with various processors such as a CPU, an MPU, a GPU, a DSU, an FPGA, and an ASIC. The controller 135 may configured using one or a plurality of processors. In addition, the controller 135 may be configured using one semiconductor chip together with the image processing engine 120 and the like.

The controller 135 controls data communication between the digital camera 100 and the PC 200 via the USB connector 155, for example. For example, the controller 135 performs control for transmitting the LV image and various notifications to the PC 200 via the USB connector 155. Furthermore, the controller 135 performs auto-focus control (AF control), auto-exposure control (AE control) and the like, for example. The controller 135 adjust the exposure in the exposure control by changing an aperture value, a shutter speed, and an ISO sensitivity, for example. The controller 135 is an example of a control circuitry in the communication device of the present embodiment.

The buffer memory 125 is a recording medium that functions as a work memory for the image processing engine 120 and the controller 135. The buffer memory 125 is implemented with a dynamic random access memory (DRAM) or the like. The flash memory 145 is a non-volatile recording medium. For example, the buffer memory 125 stores various setting information in the digital camera 100. In addition, for example, the flash memory 145 stores, for various camera states, tag definition data D1, a selectable value table, and the like for an event notification described below. Each of the memories 125 and 145 is an example of a storage in the present embodiment.

Although not illustrated, the controller 135 may have various internal memories includes a built-in ROM, for example. Various programs executed by the controller 135 are stored in the ROM. The controller 135 may include a RAM that functions as a work area of the CPU. The various memories are also examples of the storage in the present embodiment.

The card slot 140 is an interface for inserting a removable memory card 142. The card slot 140 enables electrical and mechanical connection with the memory card 142. The memory card 142 is an external memory having a recording element such as a flash memory inside. The memory card 142 can store data such as image data generated by the image processing engine 120.

The USB connector 155 is a circuit for connecting an external device such as the PC 200 to the digital camera 100 in compliance with the USB standard. The USB connector 155 receives various types of information from the external device or transmits various types of information to the external device by communication conforming to the USB standard under the control by the controller 135. The USB connector 155 is an example of a communication circuitry in the communication device of the present embodiment.

The Wi-Fi module 165 is a circuit that performs communication conforming to the Wi-Fi standard. The digital camera 100 can communicate with another device via the Wi-Fi module 165. The digital camera 100 may communicate directly with another device via the Wi-Fi module 165 or may communicate with another device via an access point. The Wi-Fi module 165 may be connectable to a communication network such as the Internet.

1-2. Configuration of PC

Figure 3:
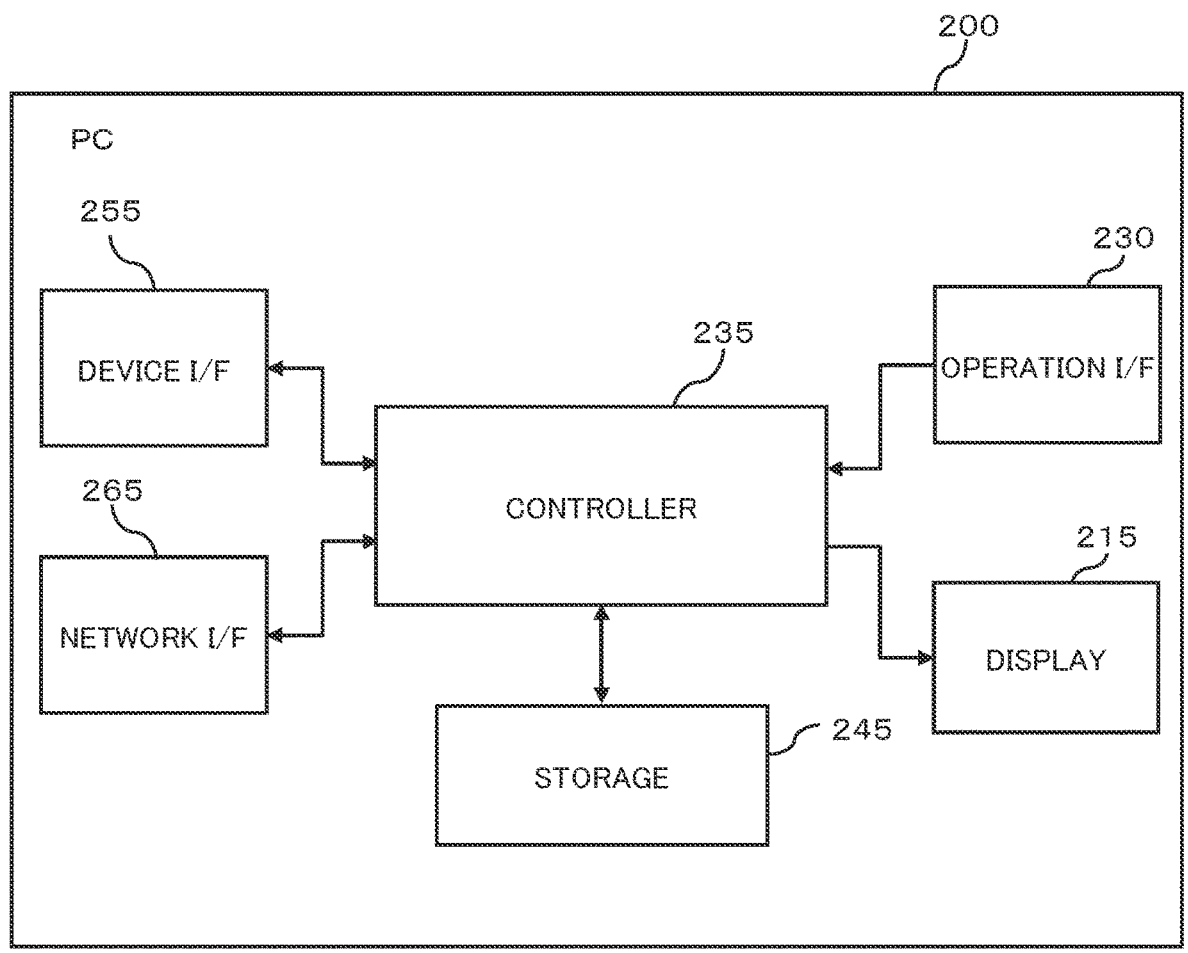
FIG. 3 is a block diagram illustrating a configuration of a PC in the imaging system.

FIG. 3 is a block diagram illustrating a configuration of the PC 200 according to the present embodiment. The PC 200 in FIG. 3 includes a display 215, an operation I/F 230, a controller 235, a storage 245, a device I/F 255, and a network I/F 265. Hereinafter, the "interface" is abbreviated as "I/F".

The display 215 includes a liquid crystal display or an organic EL display, for example. The display 215 displays the LV image, various notifications, and the like received from the digital camera 100. The display 215 may display various icons for operating the operation I/F 230, information input from the operation I/F 230, and the like.

The operation I/F 230 is a general term for operation consoles operated by a user. For example, the operation I/F 230 includes a keyboard, a mouse, a touch pad, a button, and/or a switch. The operation I/F 230 may constitute a touch panel together with the display 215. When receiving an operation by the user, the operation I/F 230 transmits an operation signal corresponding to the user operation to the controller 235.

The controller 235 is electrically connected to each hardware constituting the PC 200 and controls the operation of each hardware. The controller 235 includes a CPU and the like, and the CPU realizes a predetermined function by executing a program (software). The controller 235 may be implemented only with a hardware circuit exclusively designed to realize a predetermined function. In addition to the CPU, the controller 235 can include various circuits such as an MPU, a GPU, a DSP, an FPGA, and an ASIC. The controller 235 may include an internal memory as a temporary storage area for holding various data and programs. The controller 235 is an example of a control circuitry in the control device of the present embodiment.

The storage 245 is a recording medium that stores data, programs, and the like necessary for realizing a predetermined function in the PC 200. For example, the storage 245 includes a hard disk (HDD), a semiconductor storage device (SSD), a semiconductor memory (RAM), or the like. The storage 245 may function as a work area of the controller 235 or may be constituted by a storage area in an internal memory of the controller 235.

The device I/F 255 is a circuit for connecting an external device such as the digital camera 100 to the PC 200. The device I/F 255 performs communication conforming to the USB standard, the Bluetooth standard, or the like. The device I/F 255 in the present embodiment receives various types of information from an external device or transmits various types of information to the external device under the control by the controller 235 by communication conforming to the USB standard, for example. The device I/F 255 is an example of a communication circuitry in the control device of the present embodiment.

The network I/F 265 is a circuit that performs communication conforming to the communication standard IEEE 802.11, the Wi-Fi standard, or the like. The PC 200 can communicate with another device directly or via an access point via the network I/F 265. The network I/F 265 may be connectable to a communication network.

1-3. Data in Digital Camera

The digital camera 100 of the present embodiment stores, in advance, data such as tag definition data D1 and a selectable value table, for an event notification, in the flash memory 145. Such data in the digital camera 100 will be described with reference to FIGS. 4A and 4B.

Figure 4A:
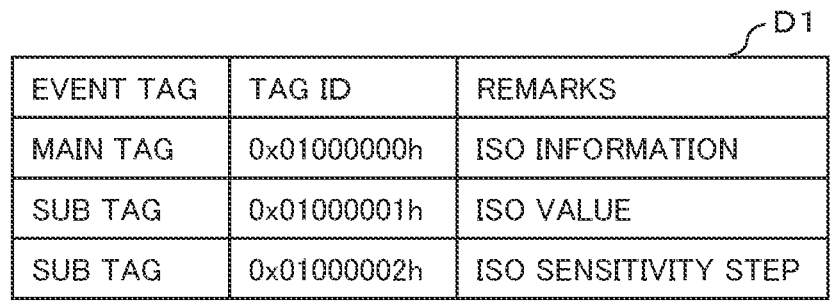
FIGS. 4A and 4B are diagrams for illustrating data stored in the digital camera.
Figure 4B:
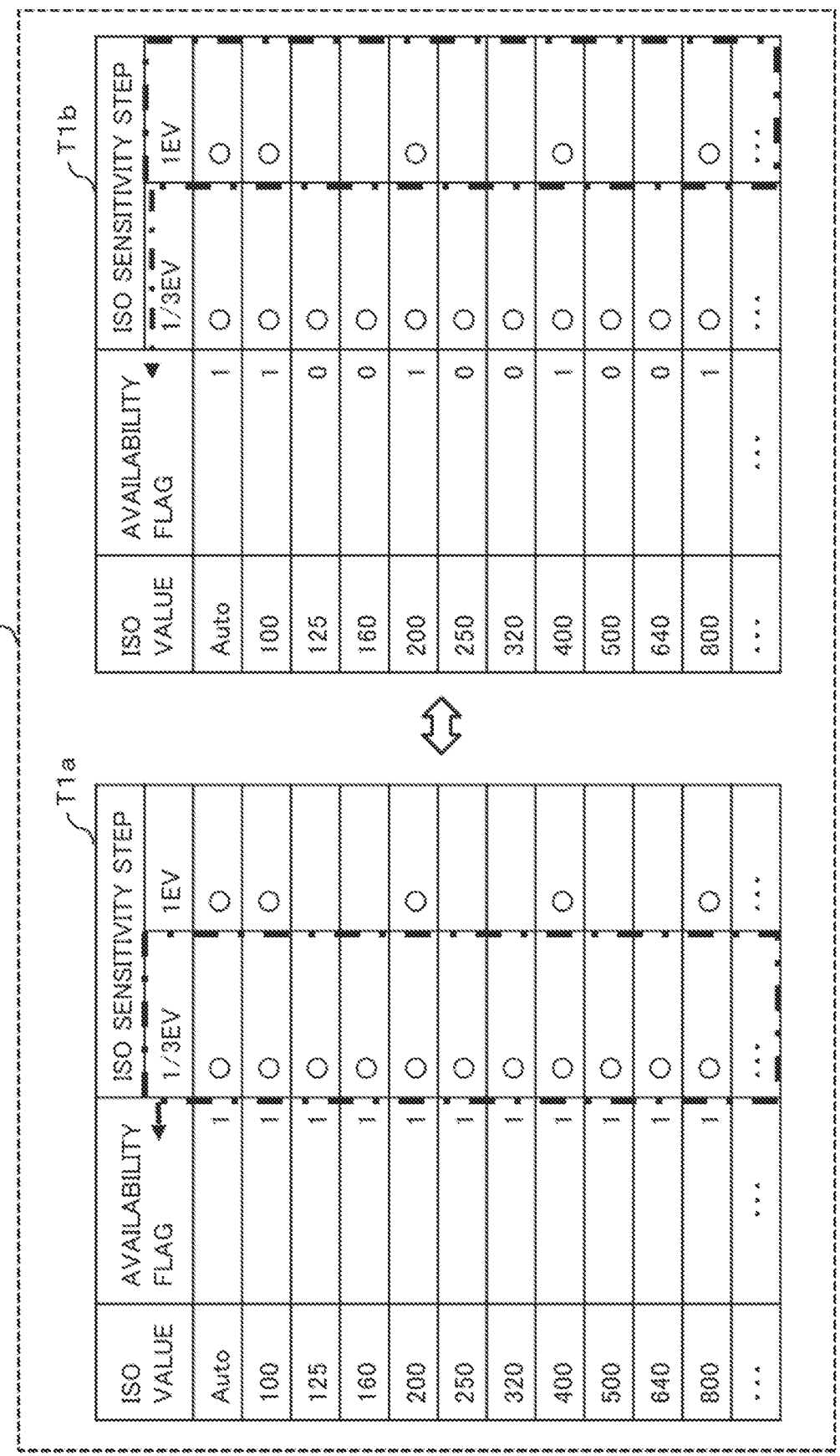

FIGS. 4A and 4B are diagrams for illustrating data stored in the digital camera 100. In the imaging system 1 of the present embodiment, an event notification to the PC 200 from the digital camera 100 is performed, the event notification notifying occurrence of an event indicating a change in the camera state. FIG. 4A illustrates tag definition data D1 for the event notification. The tag definition data D1 for the event notification manages a tag identifying a camera state corresponding to the event, in such an event notification. The tag definition data D1 of FIG. 4A includes items of "event tag" indicating tag classification according to various events and "tag ID" indicating an identifier of each tag.

The tag definition data D1 in the present embodiment manages a plurality of types of events by event tags. The event tag includes a main tag common to two or more types of events that change in association with each other and a sub tag corresponding to each type of event, for example.

In the example in FIG. 4A, an event of ISO information indicating a camera state related to ISO sensitivity is managed by the main tag. Furthermore, events of ISO value and ISO sensitivity step in the ISO information is managed by the two sub tags. The ISO value indicates a value of the ISO sensitivity, and the ISO sensitivity step indicates a step width for adjusting the value of the ISO sensitivity.

FIG. 4B illustrates a selectable value table T1 (T1a, T1b) that manages selectable ISO values according to setting of the ISO sensitivity step in the digital camera 100. In the digital camera 100 of the present embodiment, the ISO value and the ISO sensitivity step can be selected and set from the respective predetermined values in a setting menu or the like. For example, the ISO sensitivity step is selected from candidates of "⅓ EV" and "1 EV". In addition, in FIG. 4B, options of the ISO value selectable in each case where the ISO sensitivity step is set to "⅓ EV" or "1 EV" is indicated by "o".

The selectable value table T1 in FIG. 4B manages a combination of options of a selectable ISO value by a "availability flag". The availability flag indicates whether or not each option in the predetermined options is selectable. For example, when an option is selectable, the availability flag is set to "1" indicating enabled, and when an option is not selectable, the availability flag is set to "0" indicating disabled.

In FIG. 4B, the selectable value table T1a shows an example in which the availability flag is set when the ISO sensitivity step is "⅓ EV". The selectable value table T1b shows an example in which the availability flag is set when the ISO sensitivity step is "1 EV". As shown in FIG. 4B, as the selectable ISO values change according to the setting of the ISO sensitivity step, the table referred to in displaying a setting menu or the like is switched between the selectable value tables T1a and T1b, for example. For example, the switched selectable value table T1a or T1b may be held in the buffer memory 125.

2. Operation

Operations of the digital camera 100 and the PC 200 configured as described above will be described below.

In the imaging system 1 (FIG. 1) of the present embodiment, the digital camera 100 and the PC 200 perform data communication conforming to the USB standard, for example. For example, the digital camera 100 transmits an event notification to the PC 200 in response to an event that the camera state changes. The PC 200 can display the real-time camera state in the digital camera 100 on the display 215 in accordance with the event notification from the digital camera 100, for example.

Figure 5A:
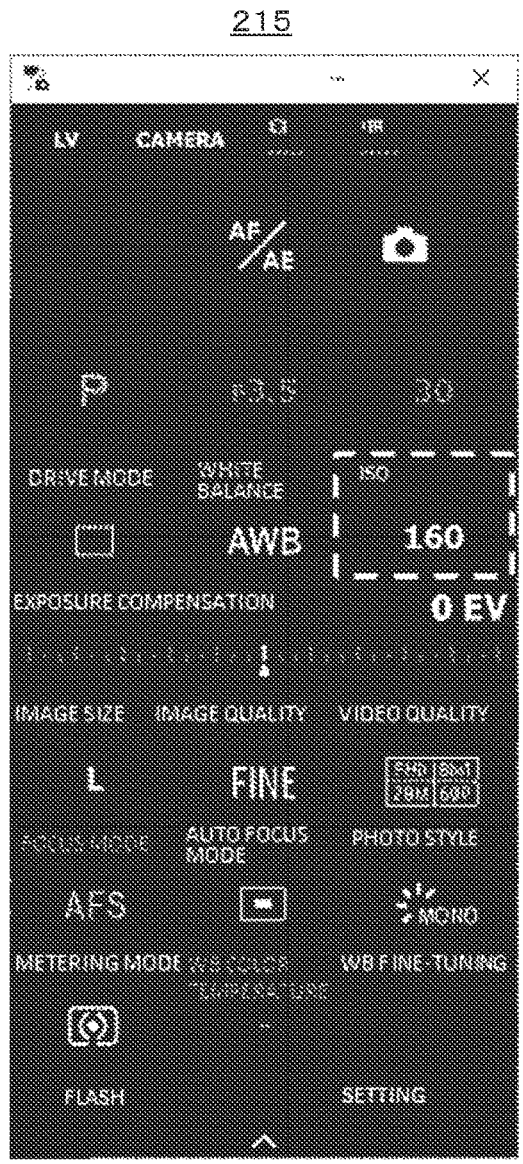
FIGS. 5A and 5B are diagrams for illustrating application screens displayed on the PC of the imaging system.
Figure 5B:
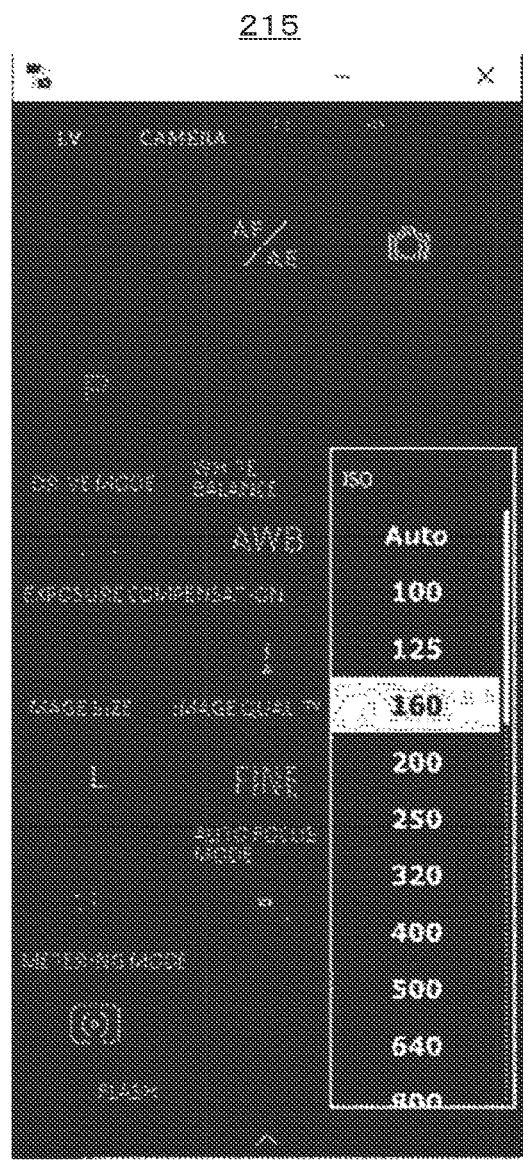

FIGS. 5A and 5B illustrate application screens displayed on the PC 200 of the imaging system 1. For example, the PC 200 acquires the ISO value from the digital camera 100 due to an event notification accompanying a setting change in the ISO sensitivity, and manage the ISO value. For example, as shown in FIG. 5A, the PC 200 displays the ISO value set in the digital camera 100 on an application screen in the display 215. The PC 200 displays the options of the ISO values that can be changed by the user as illustrated in FIG. 5B further according to the user operation or the like in the operation I/F 230 from the state in FIG. 5A. The display example in FIG. 5B displays, as the ISO value changeable from the state in which the ISO value is "160" (FIG. 5A), options when the ISO sensitivity step is "⅓ EV" (cf. FIG. 4B).

For example, a control signal can be transmitted from the PC 200 to change the ISO value to be set in the digital camera 100 by a user operation selecting an option of the ISO value displayed on the PC 200. In addition, at the time of communication between the digital camera 100 and the PC 200, the camera state such as the ISO value also changes when automatic or manual exposure control is performed in the digital camera 100, for example.

2-1. Problem Regarding Event Notification

Figure 6:
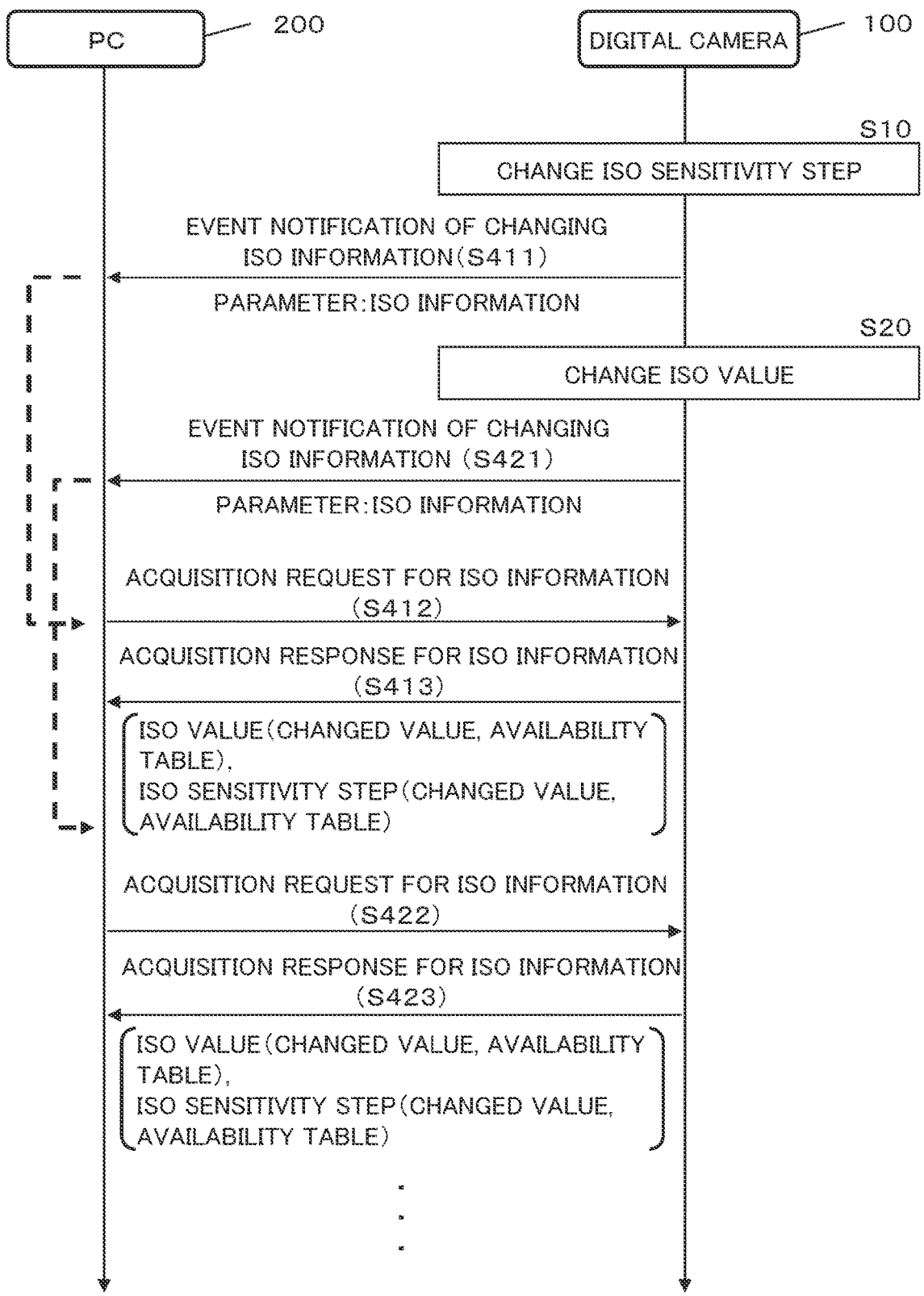
FIG. 6 is a sequence diagram for illustrating a problem in data communication for an event notification.

A problem in the data communication for the event notification will be described with reference to FIG. 6 using an example of the event related to the ISO information as described above. FIG. 6 is a sequence diagram for illustrating a problem in data communication for the event notification. The sequence in FIG. 6 shows an operation example of the event notification when the main tag in the tag definition data D1 (FIG. 4B) is used.

In the example in FIG. 6, in the digital camera 100, an event of changing the ISO sensitivity step occurs (S10), and accordingly, an event of changing the ISO value occurs (S20). For example, from the state in which the ISO sensitivity step is set to "⅓ EV" and the ISO value is set to "160", the ISO sensitivity step is changed to "1 EV" (S10), and the selectable value table T1a of the ISO value shown in FIG. 4B is changed to the selectable value table T1b. Accordingly, the ISO value is changed to "200" (S20).

In the example in FIG. 6, first, the digital camera 100 notifies the event due to the change in the ISO sensitivity step (S10) as the change in the ISO information (S411). In response to the event notification, the controller 235 of the PC 200 requests the digital camera 100 to acquire the ISO information (S412). As a response to the acquisition request, the controller 135 of the digital camera 100 transmits, as the ISO information, various data of the ISO value and the ISO sensitivity step to PC 200 (S413). For example, the PC 200 acquires the selectable value table T1 in addition to the changed value indicating each changed camera state (S412 and S413).

In the example in FIG. 6, next, the digital camera 100 also notifies an event due to a change in the ISO value (S20) as a change in the ISO information (S421). In response to the event notification, the PC 200 acquires the selectable value table T1 and the like again due to the acquisition request (S422) and the acquisition response (S423) of the ISO information as with steps S412 and S413 described above, for example.

As described above, in the operation example in FIG. 6, the same selectable value table T1 is transmitted to the PC 200 in a plurality of times of acquisition response for the ISO information (S413 and S423). As described above, when the event due to the change in the ISO information (S10 and S20) frequently occurs, communication traffic wasted for transmitting redundant selectable value tables T1 is considered to cause an increased processing load in data communication between the digital camera 100 and PC 200.

In addition, in each event notification, when the digital camera 100 receives an acquisition request from the PC 200 (S412 and S422) and then performs data transmission of a changed value or the like (S413 and S423), a concern is that processing load for each event notification becomes excessive.

Therefore, the present embodiment provides a communication method capable of reducing the processing load due to the event notification as described above by managing necessity of acquiring additional information such as the selectable value table T1 in data communication between the digital camera 100 and the PC 200.

2-2. Event Notification Operation 2-2-1. Outline of Operation

An outline of an operation to perform the event notification by the communication method in the imaging system 1 of the present embodiment will be described with reference to FIG. 7.

Figure 7:
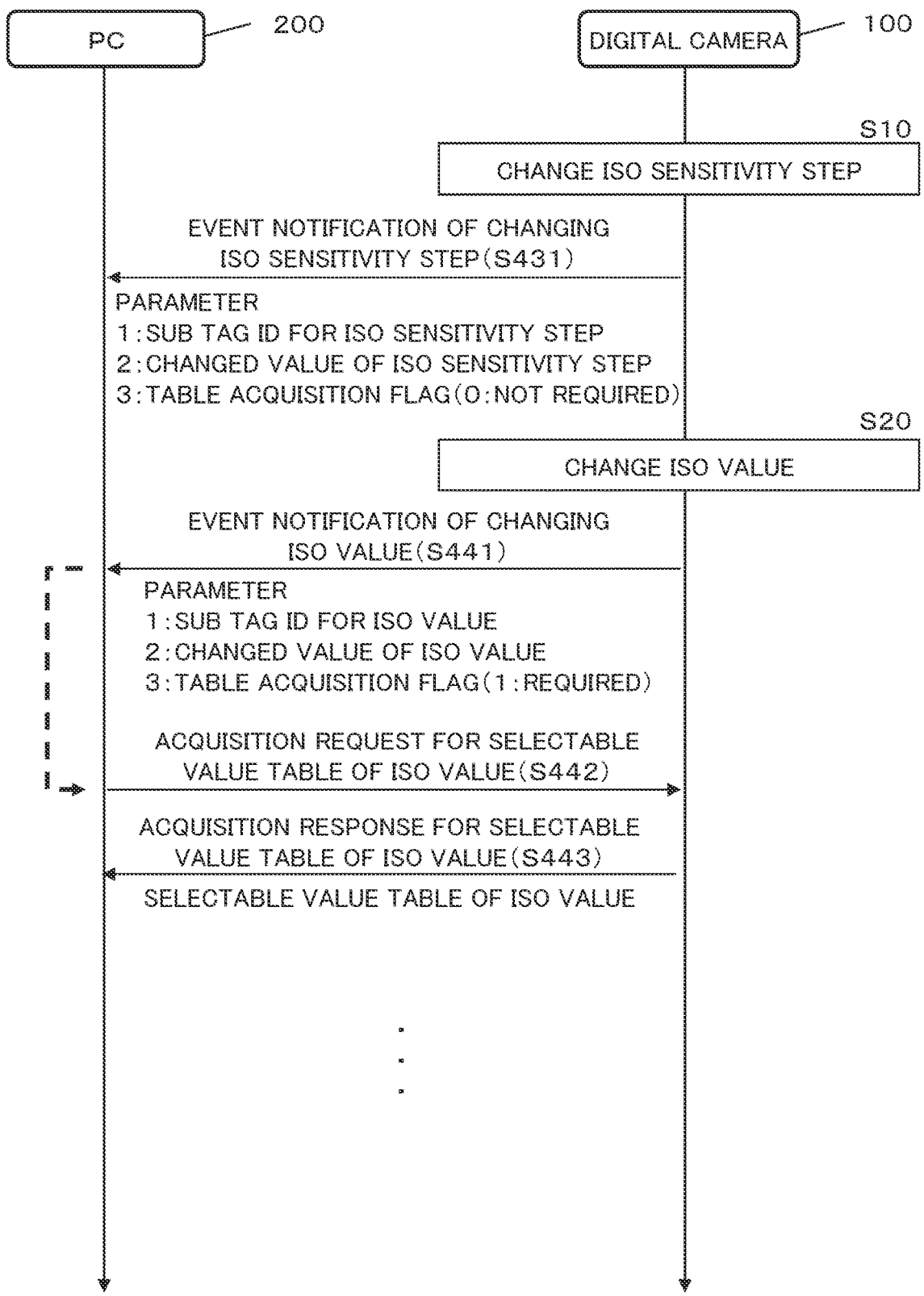
FIG. 7 is a sequence diagram for illustrating an event notification operation in the imaging system.

FIG. 7 is a sequence diagram for describing an event notification operation in the imaging system 1 of the present embodiment. FIG. 7 shows an operation example of the event notification in a case where the sub tag in the tag definition data D1 is used when an event similar to the operation example in FIG. 6 occurs in the present system 1.

In the event notification, the digital camera 100 of the present system 1 notifies the PC 200 of a generated event including the necessity of acquiring the selectable value table T1 by notification data D2 (cf. FIG. 8) for each sub tag as described below. In the example in FIG. 7, by an event notification according to the change in the ISO sensitivity step (S10) (S431), it is notified that it is not necessary to acquire the selectable value table T1 with respect to the event. In this case, unlike the example in FIG. 6, even when the ISO sensitivity step is changed (S10), the PC 200 does not acquire the ISO information in response to the event notification (unlike the acquisition in S412 and S413 in FIG. 6) and does not acquire the selectable value table T1.

In the example in FIG. 7, the PC 200 performs processing acquiring the selectable value table T1 in response to a notification that the selectable value table T1 needs to be acquired by the event notification (S441) according to the subsequent change in the ISO value (S20) (S442 and S443). For example, the PC 200 can acquire the selectable value table T1 according to the current camera state, among the selectable value tables T1a and T1b of the ISO values shown in FIG. 4B, and update and display the options of the ISO values on the application screen or the like in FIG. 5B.

According to the event notification as described above, the acquisition by the PC 200 can be selectively performed only when the selectable value table T1 changes according to the event, for example. Therefore, the processing of excessively acquiring the selectable value table T1 is avoided, and the processing load on the communication between the digital camera 100 and the PC 200 is reduced.

2-2-2. Details of Operation

Hereinafter, details of the operation in which the digital camera 100 notifies the PC 200 of the event will be described with reference to FIGS. 7 to 9B.

Figure 8:
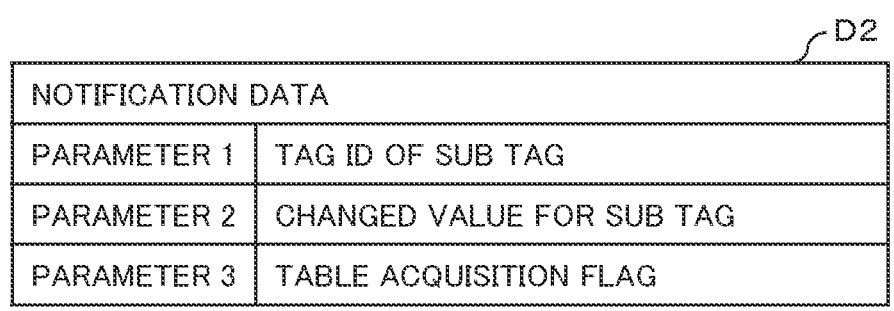
FIG. 8 is a diagram illustrating notification data for an event notification in the imaging system.
Figure 9A:
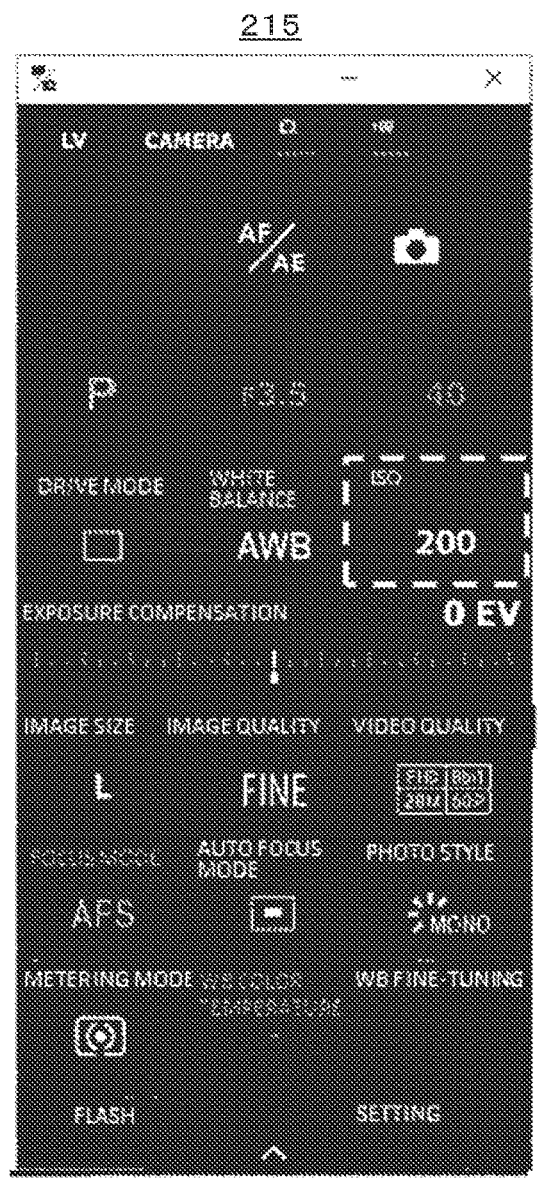
FIGS. 9A and 9B are diagrams for illustrating a display example updated from the example in FIGS. 5A and 5B in the PC.
Figure 9B:
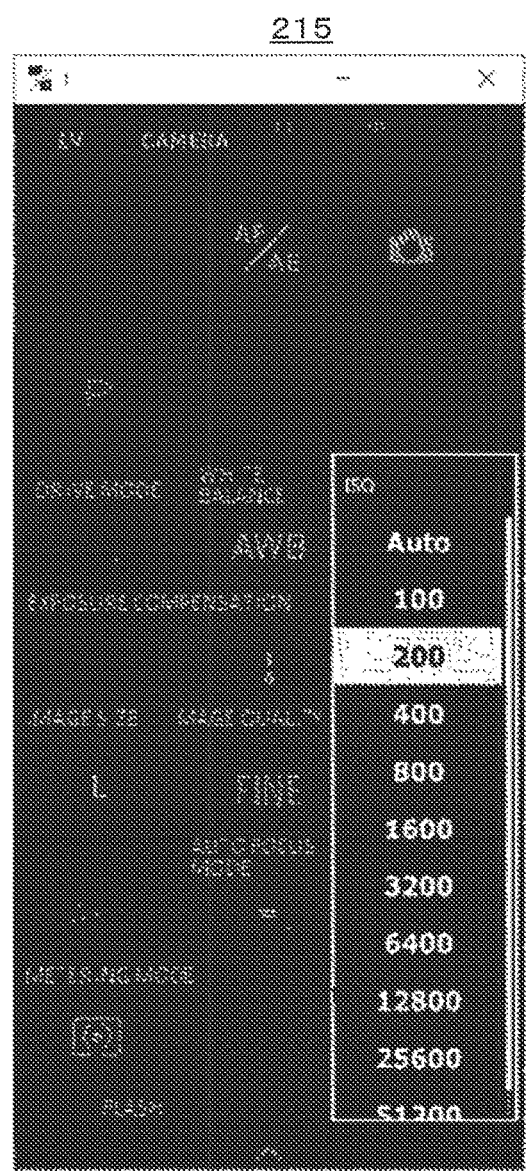

FIG. 8 is a diagram illustrating notification data D2 for the event notification in the imaging system 1. FIGS. 9A and 9B are diagrams for illustrating a display example updated from the example in FIGS. 5A and 5B in the PC 200. In the following, an example is described in which the ISO sensitivity step is changed to "1 EV" when the ISO sensitivity step is set to "⅓ EV" and the ISO value is set to "160" in the digital camera 100, as in the example in FIG. 6.

In the digital camera 100 of the present example, when the event of changing the ISO sensitivity step occurs (S10), the controller 135 generates notification data D2 indicating the event notification according to the event and transmits the notification data to the PC 200 (S431).

The controller 135 generates the notification data D2 based on the tag definition data D1 for the event notification as shown in FIG. 4A, for example. The notification data D2 illustrated in FIG. 8 includes three parameters 1 to 3, the tag ID of the sub tag in the tag definition data D1 is stored in the parameter 1, and a changed value of the camera state changed in the event of the sub tag is stored in the parameter 2. Furthermore, in the notification data D2 of the present embodiment, a table acquisition flag is stored in the parameter 3. The table acquisition flag indicates the necessity of acquiring the selectable value table T1 from the digital camera 100 by the PC 200 in response to the event notification by the notification data D2.

In the event notification in step S431, the controller 135 causes the USB connector 155 to transmit the notification data D2 including the parameters 1 to 3 according to the event due to the change in the ISO sensitivity step. For example, the controller 235 of the PC 200 receives the notification data D2 for the event notification by the device I/F 255, and acquires values stored in the respective parameters 1 to 3. In the notification data D2 in step S431, the tag ID of the ISO sensitivity step is stored in the parameter 1, the changed value of the ISO sensitivity step is stored in the parameter 2, and the table acquisition flag is stored in the parameter 3.

For example, in step S431, the controller 135 transmits the notification data D2 storing "0" in the parameter 3, as a disabled value of the table acquisition flag indicating that it is not necessary to acquire the selectable value table T1. In the digital camera 100, even when the ISO sensitivity step is changed, the selectable candidates for the ISO sensitivity step do not change. In this case, according to the notification data D2 in step S431, the processing acquiring the selectable value table and the like of the ISO sensitivity step from the digital camera 100 by the PC 200 is avoided.

On the other hand, in accordance with the change in the ISO sensitivity step (S10), options of selectable ISO values change as illustrated in FIG. 4B. In the present example, when the ISO sensitivity step is changed to "1 EV" in the digital camera 100, the ISO value is changed to a value selectable in the changed ISO sensitivity step in response to that the set ISO value "160" cannot be selected (S20). For example, the controller 135 sets an ISO value "200" having a minimum difference from the original setting value among the selectable ISO values.

For example, a conversion table of the ISO values according to the change in the ISO sensitivity step may be stored in advance in the flash memory 145 or the like and referred to by the controller 135. For example, the conversion table manages an ISO value selectable only for the ISO sensitivity step "⅓ EV" associating with an ISO value having a minimum difference from the associated ISO value and selectable for the ISO sensitivity step "1 EV".

In the example in FIG. 7, when an event of changing the ISO value occurs in digital camera 100 (S20), the controller 135 generates notification data D2 according to the event and transmits the notification data D2 to the PC 200 (S441). In the notification data D2 in step S441, a tag ID of the ISO value is stored in the parameter 1, a changed value of the ISO value is stored in the parameter 2, and "1" is stored in the parameter 3 as the enabled value of the table acquisition flag indicating that it is required to acquire the selectable value table T1.

When receiving the notification data D2 in step S441, the PC 200 requests the digital camera 100 to acquire the selectable value table T1 of the ISO value according to the table acquisition flag of the notification data D2 (S442). In response to the request, the digital camera 100 transmits the selectable value table T1 of the ISO value to the PC 200 (S443). In the present example, the selectable value table T1b (FIG. 4B) according to the changed ISO sensitivity step "1 EV" is transmitted to the PC 200.

FIGS. 9A and 9B show a display example updated from the example in FIGS. 5A and 5B based on the changed selectable value table T1b in the PC 200. In the display example in FIG. 9A, the current ISO value in the digital camera 100 is changed to "200". Furthermore, in the example in FIG. 9B, as options of selectable ISO values, options for the ISO sensitivity step is "1 EV" are displayed based on the selectable value table T1b (cf. FIG. 4B).

According to the event notification operation described above, the notification data D2 indicating the event notification is generated and transmitted to the PC 200 (S431 and S441) in response to the event in the digital camera 100 (S10 and S20). In each notification data D2, a tag ID indicating a target event to be notified, a changed value changed in the event, and a table acquisition flag indicating necessity of acquiring the selectable value table T1 according to the event are respectively stored in the parameters 1 to 3.

Accordingly, in each piece of the notification data D2, the PC 200 can be notified of the necessity of acquiring the selectable value table T1 according to whether the table acquisition flag is enabled or disabled, and the selectable value table T1 can be acquired only when the flag is enabled (S441 to S443). In addition, by specifying a target event to be notified by a sub tag corresponding to one type of event, a changed value of the event can be included in the notification data D2 and notified, and when acquisition of the selectable value table T1 is unnecessary, data communication can be completed only by event notification (S431). Therefore the event notification operation and the data structure of the notification data D2 can reduce a processing load and data traffic in communication for notifying the PC 200 of the event occurring in the digital camera 100.

As in step S20 described above, for the camera state such as the ISO value that may be automatically changed inside the digital camera 100, a buffer of a user setting value set by the user and a buffer of an automatically changed automatic setting value may be provided, for example. For example, the value of each buffer may be held in another area in the buffer memory 125 or the like. In this case, the ISO value "160" before the change in step S20 is stored in the buffer of the user setting value, and the ISO value "200" after the change is stored in the buffer of the automatic setting value. According to such two types of buffers, when there is a change to return the ISO sensitivity step to "⅓ EV" after step S20, the ISO value may be set again to "160" as before the change from the automatically changed value "200", for example.

In addition, when the above two types of buffers are used, any one of the buffers may be referred to in step S441 according to whether the change in the ISO value (S20) is a change by a user operation in the operation I/F 150 or a change accompanying the ISO sensitivity step (S10), for example. For example, in step S441, the ISO value held in the buffer referred to may be set as the changed value to be notified to the PC 200.

2-4. Operation of Digital Camera

In the imaging system 1 of the present embodiment, the event notification operation illustrated in FIG. 7 is performed using the table acquisition flag in the notification data D2 as described above, for example. An operation of the digital camera 100 to perform the event notification, in the event notification operation of the present embodiment, will be described with reference to FIGS. 10 to 12B.

Figure 10:
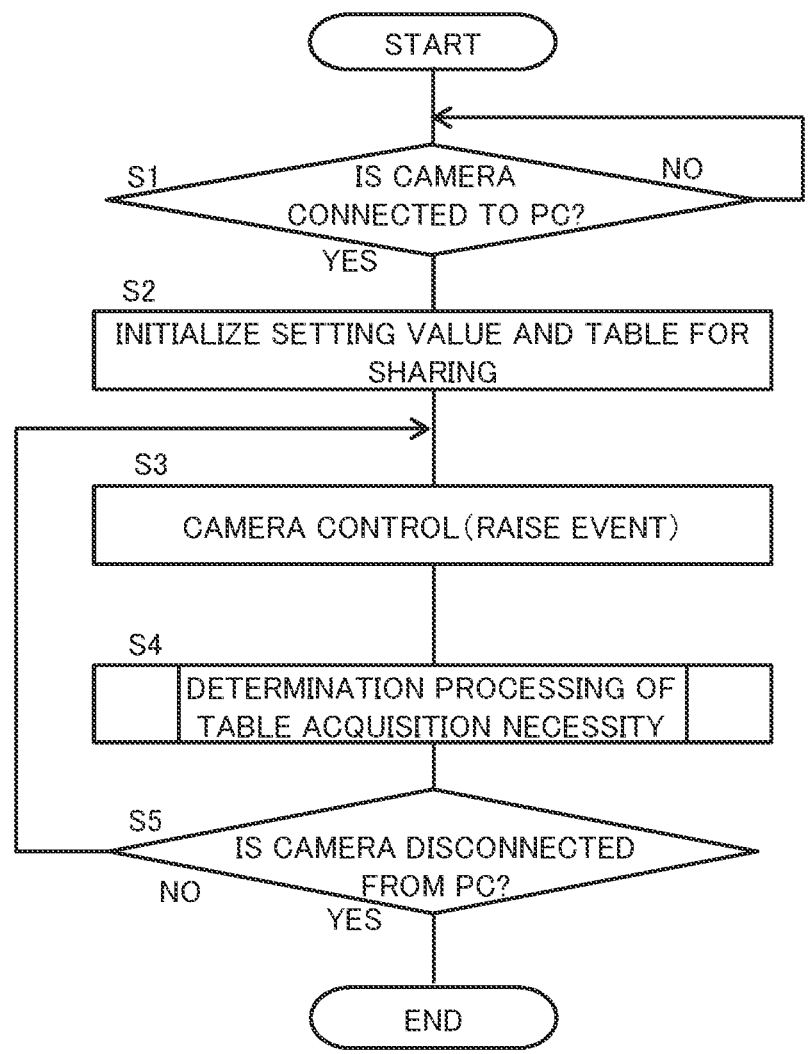
FIG. 10 is a flowchart illustrating an operation of the digital camera in the event notification operation.

FIG. 10 is a flowchart illustrating an operation of the digital camera 100 in the event notification operation. The processing of the present flowchart is started before execution of the event notification operation shown in FIG. 7, and is performed in parallel, for example. Each processing of the present flowchart is performed by the controller 135 of the digital camera 100, for example.

First, the controller 135 detects whether the digital camera 100 is connected to the PC 200 in the imaging system 1 (S1). The controller 135 detects presence or absence of the connection to the PC 200 in the USB connector 155 based on a connection request from an application in the PC 200, for example. When the digital camera is not connected to the PC 200 (NO in S1), the controller 135 repeats the detection in step S1 in a predetermined period such as a frame period.

When detecting the connection to the PC 200 (YES in S1), the controller 135 initializes a setting value and a table each for sharing with PC 200. The setting value and the table are shared for displaying various camera states of the digital camera 100 on an application screen or the like in the PC 200 (S2). According to the selectable value table T1, the table for sharing stores options of values changeable by a menu list or the like as shown in FIG. 5B, from the setting values for sharing displayed on the application screen as shown in FIG. 5A, for example.

The setting value and table for sharing are held in the buffer memory 125 or the like for each camera state, and are notified to the PC 200 by the event notification or the like, for example. In step S2, the controller 135 may transmit the initialized setting value and table for sharing to the PC 200 via the USB connector 155, for example.

Figure 11A:
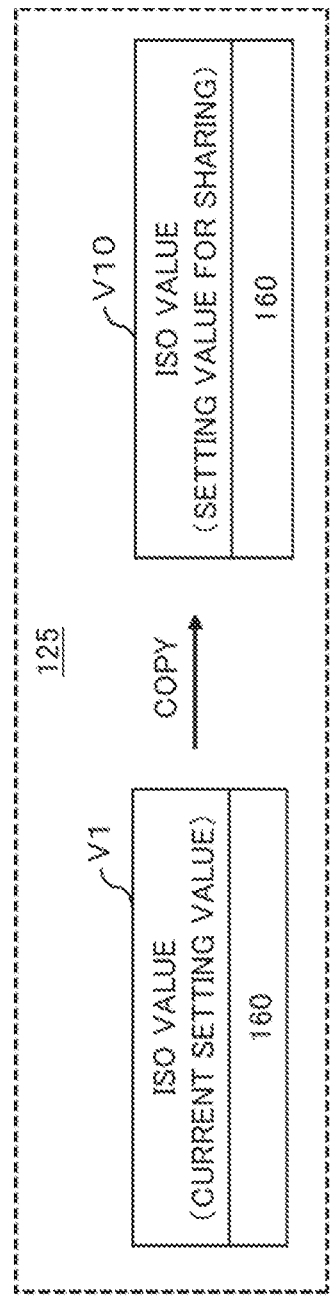

FIGS. 11A and 11B are diagrams for illustrating initialization of the setting value and table for sharing in the digital camera 100 (S2). FIGS. 11A and 11B show an example of initializing the ISO value as the camera state. For example, as shown in FIG. 11A, in the buffer memory 125, the controller 135 initializes the setting value for sharing V10 by the ISO value set in the digital camera 100, that is, a current setting value V1.

In addition, as shown in FIG. 11B, the controller 135 initializes the table for sharing T10 by the selectable value table T1, which is set in the digital camera 100 and read from the flash memory 145 to the buffer memory 125, for example (S2). In the example in FIG. 11B, the availability flag for each option of the ISO value is initialized according to the selectable value table T1a, which is for the ISO sensitivity step of "⅓ EV".

Next, the controller 135 performs various controls such as exposure control in the digital camera 100 (S3). By such various controls, when the camera state changes in the digital camera 100, an event due to the change in the camera state occurs. In the example in FIG. 7, the ISO sensitivity step is changed and the ISO value is changed, and an event corresponding to each change occurs (S10 and S20).

After an event occurs under the control in the digital camera 100 (S3), the controller 135 determines whether or not it is necessary for the PC 200 to acquire the selectable value table in response to the event (S4). For example, the controller 135 determines necessity of acquiring for the event by comparing the table for sharing T10 with the current selectable value table T1 in the digital camera 100. For example, the controller 135 generates the notification data D2 in which the enabled or disabled table acquisition flag is stored according to the determination result, and transmits the notification data D2 to the PC 200 (S4).

In the example in FIG. 7, in step S4, it is determined that acquiring the selectable value table T1 is unnecessary when the event of changing the ISO sensitivity step (S10) occurs, and it is determined that acquiring the selectable value table T1 is necessary when the event of changing the ISO value (S20) occurs. Details of such determination processing of table acquisition necessity (S4) will be described below.

Thereafter, the controller 135 detects whether or not the digital camera 100 is disconnected from the PC 200 based on a control signal from the PC 200 and/or a connection state or the like in the USB connector 155, for example (S5). When not disconnected from the PC 200 (NO in S5), the controller 135 repeats the detection in step S5 at a predetermined cycle, for example.

When disconnected from the PC 200 (YES in S5), the controller 135 ends the processing of the present flowchart. The processing of the present flowchart may be repeatedly performed while the digital camera 100 is powered on.

According to the above processing, the digital camera 100 determines necessity of acquiring the selectable value table by the PC 200, in response to the occurrence of the event (S3) by various types of control during the connection with the PC 200, and transmits the notification data D2 to the PC 200 according to the determination result (S4). As described above, according to the event that occurred, by the notification data D2, the PC 200 can acquire the selectable value table T1 only when it is necessary to acquire, such as when the selectable value table T1 is changed by a change in the camera state in the event, for example.

2-4-1. Determination Processing of Table Acquisition Necessity

The determination processing of table acquisition necessity (S4) in the operation of the digital camera 100 as described above will be described in detail with reference to FIGS. 12A and 12B.

Figure 12A:
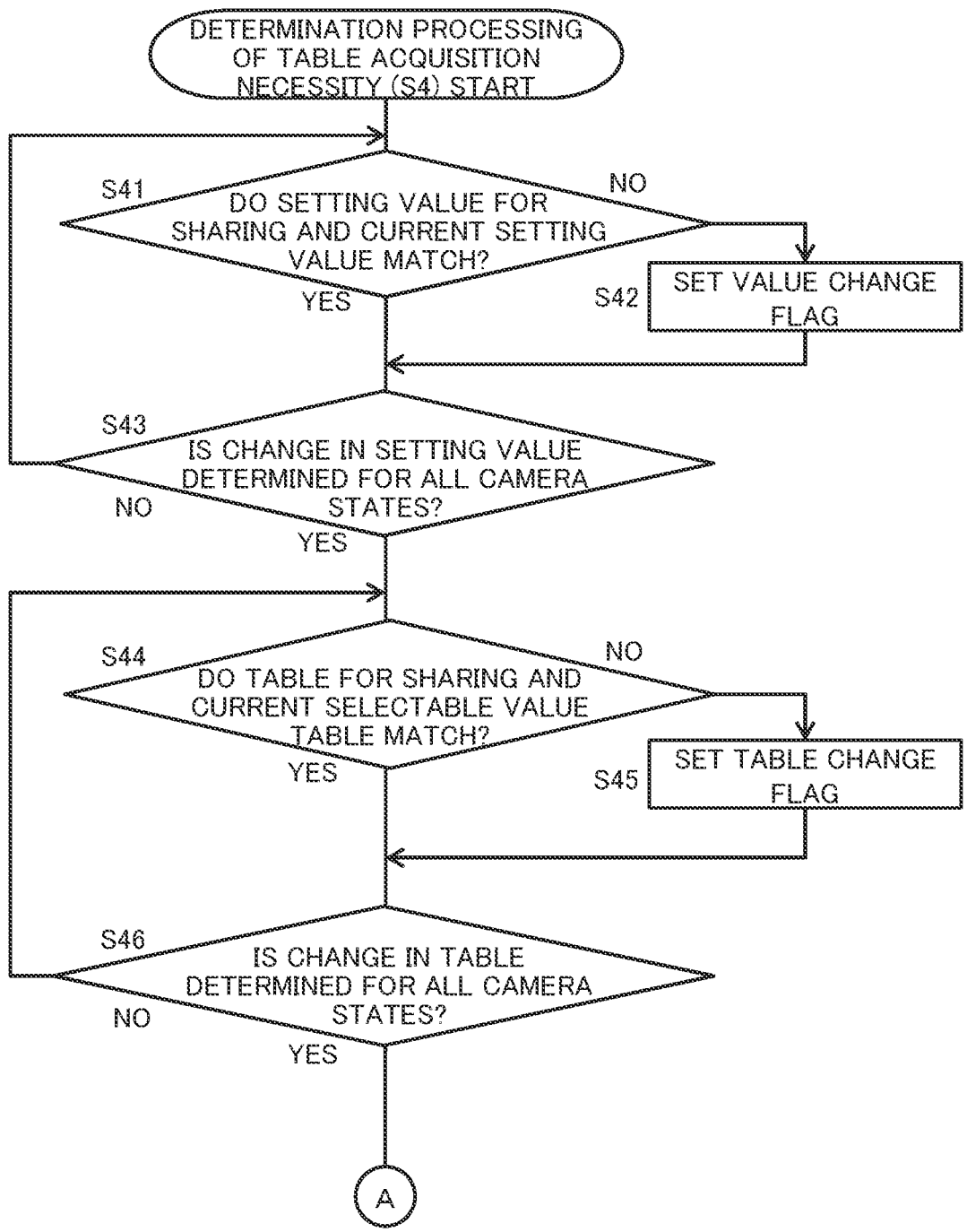
FIG. 12A is a flowchart illustrating a determination processing of table acquisition necessity determination processing in the digital camera.

FIG. 12A is a flowchart illustrating the determination processing of table acquisition necessity (S4 in FIG. 10) in the digital camera 100. FIG. 12B is a flowchart illustrating the determination processing of table acquisition necessity subsequent to FIG. 12A. For each camera state controlled in the digital camera 100 (S3), the processing of the present flowchart is started in a state where the setting value for sharing V10, the table for sharing T10, the current setting value V1, and selectable value table T1 are held in the buffer memory 125 or the like.

First, for example, for one camera state, the controller 135 determines whether the setting value for sharing V10 matches the current setting value V1 (S41). When the setting values V10 and V1 do not match each other (NO in S41), the controller 135 sets a value change flag indicating that the setting value V1 is changed, associating the value changed flag with the sub tag in the camera state, for example (S42). The value change flag manages presence or absence of the change in the setting value V1, by switching a predetermined enabled value or disabled value held in the buffer memory 125 or the like, for example.

Next, the controller 135 determines whether or not the change in the setting value V1 is determined for all camera states being targets of the event notification based on the number of executions of step S41, for example (S43). In addition, when the sharing setting value V10 matches the current setting value V1 (YES in S41), the controller 135 proceeds to step S43 without performing the processing in step S42. When the change in the setting value V1 is not determined for all the camera states (NO in S43), the controller 135 repeats the determination in step S41. In the example in FIG. 7, for each of the ISO sensitivity steps and ISO values, a value change flag is set according to the change in steps S10 and S20 (NO in S41, S42).

When determining the change in the setting value V1 for all the camera states (YES in S43), the controller 135 determines whether the table for sharing T10 and the current selectable value table T1 match each other for one camera state, for example (S44).

When the sharing table T10 does not match the current selectable value table T1 (NO in S44), the controller 135 sets a table change flag indicating that the selectable value table T1 is changed due to the occurrence of the event (S45). The table change flag manages presence or absence of the change in the selectable value table T1 for each camera state by, an enabled value or a disabled value similar to the value change flag, for example.

The controller 135 determines whether or not the change in the selectable value table T1 is determined for all the camera states being targets of the event notification based on the number of executions of step S44, for example (S46). When the sharing table T10 matches the current selectable value table T1 (YES in S44), the controller 135 proceeds to step S46 without performing the processing in step S45. When the change in the selectable value table T1 is not determined for all the camera states (NO in S46), the controller 135 repeats the determination in step S44. In the example in FIG. 7, the selectable value table T1 of the ISO value is changed with the change in the ISO sensitivity step (S10), and the table change flag is set (NO in S44, S45).

Figure 12B:
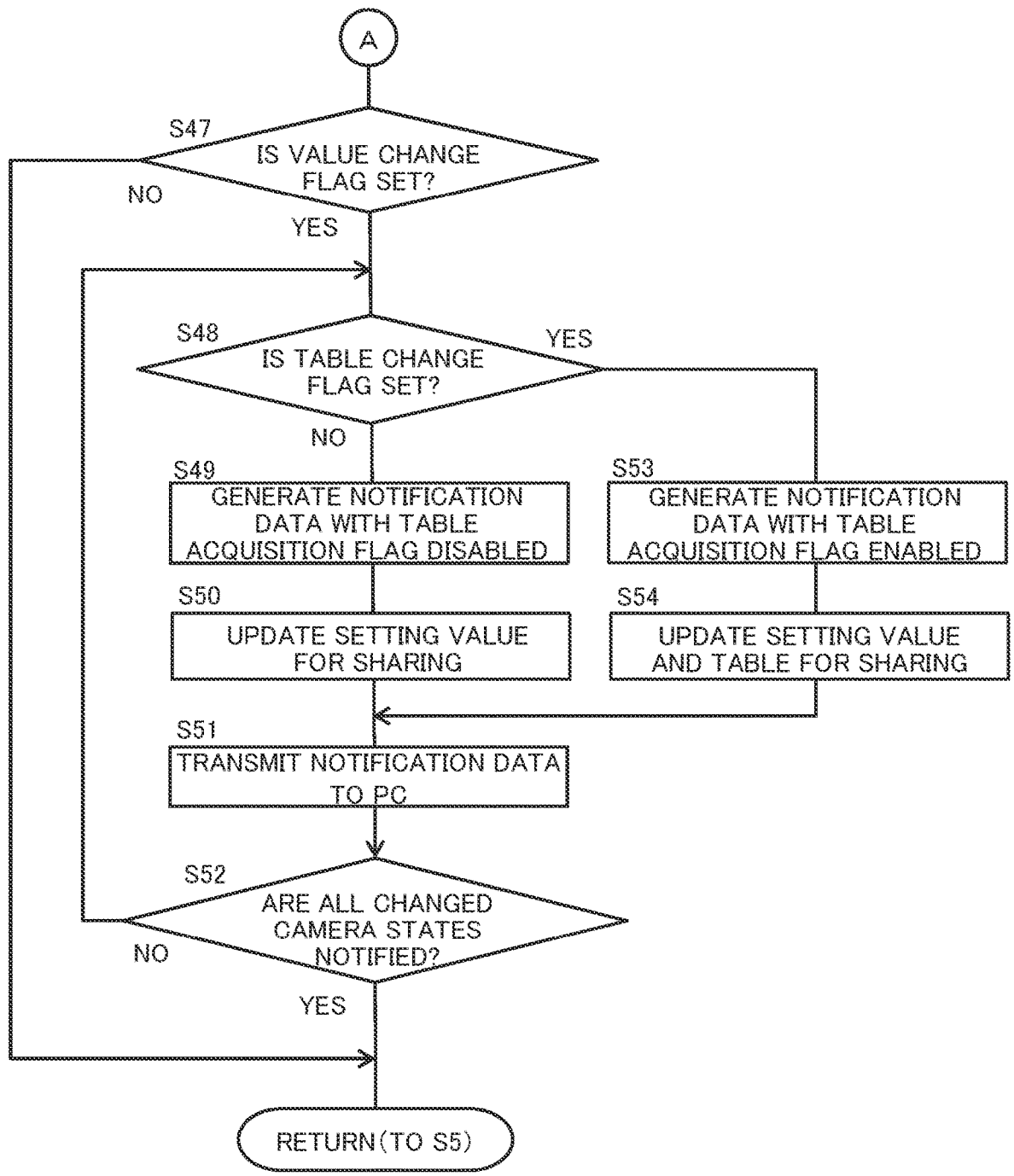
FIG. 12B is a flowchart illustrating the determination processing for table acquisition necessity determination processing subsequent to FIG. 12A.

When determining the change in the selectable value table T1 for all the camera states (YES in S46), as shown in the flowchart in FIG. 12B, the controller 135 refers to the buffer memory 125 to determine whether the value change flag is set, for example (S47).

When the value change flag is set (YES in S47), the controller 135 further determines whether the table change flag is set (S48). The determination in step S48 is performed for each event generated by various types of control (S3) in the digital camera 100, first determining whether the table change flag is set for the event for which the value change flag is set, for example. When the table change flag is not set for the event, the setting of the table change flag may be determined for another event that is not notified yet (NO in S52 described below), and the subsequent processing may be performed according to the determination result.

When the table change flag is not set (NO in S48), the controller 135 generates the notification data D2 so that the table acquisition flag indicates disabled in the notification data D2 of the event notification (S49). In the example in FIG. 7, the notification data D2 with the table acquisition flag disabled is generated as the notification data D2 of the event notification (S431) according to the change in the ISO sensitivity step (S10), (S49). The generated notification data D2 is held in the buffer memory 125 or the like, for example. In addition, in this case, the controller 135 updates the setting value for sharing V10 to the current setting value V1, that is, the changed setting value, similarly to the initialization processing shown in FIG. 11A, for example (S50).

Subsequently, the controller 135 transmits the generated notification data D2 to the PC 200 via the USB connector 155 (S51).

After transmitting the notification data D2 (S51), the controller 135 determines whether the PC 200 is notified of all the camera states in which the value change flag or the table change flag is set (S52). The controller 135 refers to the buffer memory 125 to perform the determination according to the presence or absence of the notification data D2 generated for each camera state, for example. When all the camera state are not notified (NO in S52), the controller 135 repeats the processing after step S47 for the camera state, for example. In the present example, it is determined that the event of the ISO value is not notified (NO in S52), and the processing in and after step S47 is performed again.

When the table change flag is set (YES in S48), the controller 135 generates the notification data D2 with the table acquisition flag enabled (S53). In the example in FIG. 7, the notification data D2 in which the table acquisition flag is enabled is generated as the notification data D2 of the event notification (S441) according to the change in the ISO value (S20), (S53). In addition, in this case, similarly to the initialization processing (FIGS. 11A and 11B), the controller 135 updates the sharing setting value V10 and the table for sharing T10 respectively to the current, that is, the changed setting value V1 and the changed selectable value table T1, for example (S54).

Similarly to after the execution of step S50, the controller 135 transmits the generated notification data D2 to the PC 200 (S51), and determines whether or not the PC 200 is notified of all the camera states for which the value change flag or the table change flag is set, for example (S52).

When all the camera states are notified (YES in S52) or when the value change flag is not set (NO in S47), the controller 135 ends the processing of the present flowchart and returns to step S5 in FIG. 10.

According to the above processing, when the selectable value table T1 changes due to the occurrence of the event (NO in S44), the table change flag is set (S45), and the notification data D2 with the table acquisition flag enabled is generated (YES in S48, S53). On the other hand, for the event in which the table change flag is not set, the notification data D2 with the table acquisition flag disabled is generated (NO in S48, S49). As described above, the enablement or disablement of the table acquisition flag in the notification data D2 of the event notification can be switched according to the presence or absence of the change in the selectable value table T1 due to the event. Therefore, for example, the selectable value table T1 can be selectively acquired based on the notification data D2 received by the PC 200.

In the above description, the description is made using an example in which not only the selectable value table T1 of the ISO values but also the values themselves of the ISO values are changed (S20) with the change in the ISO sensitivity step (S10) as shown in FIG. 7. The above processing is not limited to the above example, and can also be applied to, for example, a case where the selectable value table T1 of the ISO value is changed by a change in the ISO sensitivity step and the value of the ISO value is not changed (e.g., a case where the ISO sensitivity step is changed when the ISO value is "200"). For example, after the notification data D2 is generated for the ISO sensitivity step (S49), the notification data D2 in which the table acquisition flag is enabled for the ISO value may be generated (S53) according to the setting of the value change flag of the ISO sensitivity step (YES in S47).

In the above case, in the notification data D2 generated in step S53, the parameter 2 (cf. FIG. 8) for storing the changed ISO value may be null or the like, for example. In addition, in this case, in step S54, only the table for sharing T10 may be updated.

In the above description, an example is described in which after the determination (S41) regarding the setting of the value change flag (S42), the determination regarding the setting of the table change flag (S45) is performed (S44). The execution order of steps S41 to S46 is not limited to the above example, and the processing of steps S44 to S46 may be performed before steps S41 to S43, or may be performed in parallel with the processing of steps S41 to S43, for example.

3. Effects

As described above, the digital camera 100 of the present embodiment is an example of a communication device that notifies the external PC 200 (an example of a control device) of information managed in the digital camera 100. The digital camera 100 includes the USB connector 155 (an example of a communication circuitry) and the controller 135 (an example of a control circuitry). The USB connector 155 performs data communication with the PC 200. The controller 135 generates the notification data D2 in response to an event that a state in the digital camera 100 changes (S10 and S20), and controls the USB connector 155 to transmit the notification data D2 to the PC 200 (S431 and S441). The notification data D2 (cf. FIG. 8) includes the tag ID of the sub tag in the parameter 1 (an example of an event identification region) to identify a target event to be notified, the parameter 2 (an example of a data storage region) to store the changed value for the sub tag (an example of state data indicating a changed state) changed in the target event to be notified, and the table acquisition flag in the parameter 3 (an example of a necessity identification region) to indicate whether the PC 200 requires acquiring the selectable value table T1 (an example of additional information) regarding the target event to be notified.

According to the digital camera 100 described above, in the notification data D2 generated in response to the event, necessity of acquiring the additional information such as the selectable value table T1 can be notified to the PC 200 by the table acquisition flag. Therefore, for example, acquisition of additional information by the PC 200 can be selectively performed based on the notification data D2, and a processing load in data communication for notifying the PC 200 of a change in the camera state in the digital camera 100 can be reduced.

In addition, according to the data structure of the notification data D2, the digital camera 100 of the present embodiment can perform event notification, for example, for each sub tag of the tag definition data D1 shown in FIG. 4A, that is, for each type of the event corresponding to the sub tag (S431 and S441). Therefore, in the notification data D2, the parameter of the event notification can be set according to the type of the occurring event.

In addition, according to the notification data D2 of the present embodiment, the digital camera 100 can store the changed value changed by the target event to be notified in the parameter of the event notification itself and transmit the changed value. Accordingly, for example, when it is not necessary to acquire the selectable value table T1, the acquisition of the changed value can be completed only by the event notification, without performing the acquisition request from the PC 200 in response to the event notification and the responsive data transmission from the digital camera 100 (S431). Therefore, the processing load and the like due to the communication between the digital camera 100 and the PC 200 can be further reduced.

In the present embodiment, the additional information includes a selectable value table T1 (an example of a management table) that manages a combination of options each selectable as the camera state (an example of the state data) of the target event to be notified. According to such a selectable value table T1, for example, selectable options can be displayed in the PC 200, to which the event is notified, based on the acquired selectable value table T1 as the notification destination (cf. FIGS. 5A, 5B, 9A, and 9B).

In the present embodiment, the controller 135 controls the table acquisition flag according to the target event to be notified being any one of the event of the ISO value (an example of a first event) for changing the camera state among the combinations of options in the selectable value table T1 and the event of the ISO sensitivity step (an example of a second event) for changing the combinations of options in the selectable value table T1 (S4, S431, and S441). Therefore, it is possible to notify the necessity of acquiring the selectable value table T1, by switching the enablement or disablement of the table acquisition flag, between the event of the ISO value and the event of the ISO sensitivity step, according to the presence or absence of a change in the selectable value table T1, for example.

In the present embodiment, when the event of the ISO value (S10) and the event of the ISO sensitivity step (S20) occur successively, the controller 135 generates each notification data D2 such that the table acquisition flag indicates, in one of the notification data D2 for the event of the ISO value and the notification data D2 for the event of the ISO sensitivity step, that acquiring the selectable value table T1 is required (S431 and S441). Therefore, the PC 200 receiving notification data D2 for the respective events can selectively acquire the selectable value table T1 for one of the events, and the processing load on the communication between the digital camera 100 and the PC 200 can be reduced by avoiding excessive acquisition processing.

In the present embodiment, the digital camera 100 being an example of a communication device constitutes an imaging apparatus that captures an image to generate image data. In the present embodiment, the event indicates a change in an ISO sensitivity step or an ISO value as an example of a change in the camera state (an example of a setting state) for image capturing in the digital camera 100, and the options each corresponds to a setting value selectable for the setting state in the digital camera 100. Therefore, for example, the PC 200 receiving the event notification can display the latest camera state and selectable setting values regarding image capturing of the digital camera 100, and can facilitate image capturing for the user. In addition, for example, the PC 200 may receive a user operation selecting the selectable setting value, and transmit a control signal indicating a change in the setting value to the digital camera 100.

In the present embodiment, the selectable value table T1 manages combinations of the setting values of the ISO value, as an example of combinations of the setting values selectable for an exposure state in image capturing as the setting state (cf. FIG. 4B). For example, even when the combination of selectable setting values of the ISO values changes when the exposure control is performed in the digital camera 100, the PC 200 can update the display of the selectable setting values and the like by acquiring the selectable value table T1 after the change according to the event notification.

In the present embodiment, the controller 135 controls the USB connector 155 to perform data communication with the PC 200 in accordance with a Picture Transfer Protocol (PTP). Therefore, for example, the event notification can be performed according to a protocol similar to that of the image transfer.

The PC 200 of the present embodiment is an example of a control device to which information is notified from the external digital camera 100 (an example of a communication device). The PC 200 includes the device I/F 255 (an example of a communication circuitry) and the controller 235 (an example of a control circuitry). The device I/F 255 performs data communication with the digital camera 100. The controller 235 controls an operation to receive, from the digital camera 100 via the device I/F 255, the notification data D2 in response to an event that a state in the digital camera 100 changes (S431 and S441). The notification data D2 includes the tag ID of the sub tag in the parameter 1 (an example of an event identification region) to identify a target event to be notified, the parameter 2 (an example of a data storage region) to store a changed value for the sub tag (an example of state data indicating a changed state) changed in the target event to be notified, and the table acquisition flag in the parameter 3 (an example of a necessity identification region) indicating whether the PC 200 requires acquiring the selectable value table T1 (an example of additional information) regarding the target event to be notified. When receiving the notification data D2 with the table acquisition flag indicating that the PC 200 requires acquiring the selectable value table T1 from the digital camera 100 via the device I/F 255 (S441), the controller 235 requests the selectable value table T1 from the digital camera 100 (S442). When receiving notification data D2 with the table acquisition flag indicating that the PC does not require acquiring the selectable value table T1 via the device I/F 255 (S431), the controller 235 does not request the selectable value table T1 from the digital camera 100.

According to the PC 200 described above, it is possible to selectively acquire the selectable value table T1 based on the table acquisition flag of the notification data D2 received from the digital camera 100 according to the event. Therefore, it is possible to reduce the processing load in the data communication for notifying the PC 200 of the change in the camera state in the digital camera 100.

Second Embodiment

Hereinafter, a second embodiment of the present disclosure will be described with reference to FIGS. 13 to 16. In the first embodiment, regarding the change in the ISO information under the exposure control, the imaging system 1 that manages, in the notification data D2, necessity of acquiring the selectable value table T1 by the PC 200 is described. In the second embodiment, an imaging system 1 that manages necessity of acquiring the selectable value table T1 for a change in the camera state due to a user operation or the like before capturing will be described.

Hereinafter, description of configurations and operations similar to those of the imaging system 1 according to the first embodiment will be omitted as appropriate, and the imaging system 1 according to the present embodiment will be described.

The digital camera 100 of the present embodiment has a plurality of capturing modes prepared in advance so that a user can easily capture an image with a preferred color tone and/or image quality. Hereinafter, these capturing modes are each referred to as a "photo style". In the digital camera 100 of the present embodiment, when events, in which various camera states change, occur due to a user operation or the like switching the photo style, the PC 200 is notified of the events.

FIG. 13 is a diagram for illustrating a camera state to be notified in the imaging system 1 of the present embodiment. For example, as shown in FIG. 13, photo styles such as "standard", "vivid", "natural", "monochrome", "cine like", "709 like", and "V-log" are prepared.

The "standard" is a standard setting, and the "vivid" is a mode in which saturation and contrast are relatively high and a vivid effect can be obtained. The "natural" is a mode in which contrast is relatively low and a soft effect can be obtained. The "monochrome" is a mode for obtaining a monochromatic effect without a tint. "Cine like" is a mode in which a dynamic range prioritized or contrast-emphasized gamma curve effect is obtained. "709 like" is a mode in which a gamma curve effect equivalent to the Rec. 709 standard can be obtained so as to compress a high luminance portion and suppress overexposure. "V-log" is a mode in which a gamma curve can be set so as to obtain a video with rich gradation by image processing or the like after capturing.

When one photo style is selected, various control parameters are set so that an image having an effect indicated by the photo style is captured. Specifically, values of all or some of the respective control parameters of contrast, highlight, shadow, saturation, hue, sharpness, and noise reduction are set for each photo style. In addition, respective control parameters of the filter effect in the monochrome, and the knee setting in the 709 like are further set.

In the digital camera 100 of the present embodiment, in each photo style, each control parameter can be adjusted further in accordance with the user's preference. In FIG. 13, when each photo style is selected, a control parameter that can be adjusted by the user, that is, an adjustment item is indicated by "o", and a range or a candidate of an adjustable value is illustrated side by side. For example, for each photo style, a selectable value table of each control parameter is stored in the flash memory 145 or the like as an option of a value in which each control parameter can be changed by the user's adjustment.

FIG. 14 is a diagram for illustrating a first modification of the selectable value table in the present embodiment. In the digital camera 100 of the present embodiment, for example, options of common values are used for a plurality of adjustment items. FIG. 14 illustrates selectable value tables T11 and T12 changed commonly to the respective adjustment items of contrast, highlight, shadow, saturation, and hue when the photo style is changed from standard to V-log. In the example in FIG. 14, in accordance with the adjustment item for each photo style in FIG. 13, the table T11 in which all item values are selectable, the item values being candidates for the value in each adjustment item, is changed to the table T12 in which all the item values are unselectable.

In the imaging system 1, for example, when acquiring the selectable value table T12 in which all the item values are unselectable, the PC 200 may hide the area corresponding to the adjustment item on the application screen (cf. FIGS. 5A and 5B) that receives the setting change and the like by the user.

FIG. 15 is a diagram for illustrating a second modification of the selectable value table in the present embodiment. FIG. 15 illustrates selectable value tables T21 and T22 changed commonly to the respective adjustment items of sharpness and noise reduction when the photo style is changed from standard to V-log as in the example in FIG. 14. In the example in FIG. 15, the selectable value table T21 according to the range of item values adjustable when the standard being selected is changed to the selectable value table T22 according to the adjustable range when the V-log being selected.

As described above, although the selectable value tables T11 to T22 of various adjustment items can be changed by changing the photo style, even when the item value of each adjustment item is changed, the selectable value tables T11 to T21 are not changed, for example. For example, similarly to the operation example of the first embodiment (FIG. 7), the imaging system 1 of the present embodiment performs the event notification by the notification data D2 in which the enablement or disablement of the table acquisition flag is switched according to whether the occurring event is the change in the photo style or the change in each adjustment item. As described above, also in the imaging system 1 of the present embodiment, the selectable value table can be selectively acquired by the PC 200, and the processing load on the communication between the digital camera 100 and the PC 200 can be reduced.

As described above, the selectable value tables T11, T12, T21, and T22 of the present embodiment manage a combination of the item values for the adjustment items in the photo style, the combination of the item values being an example of a combination of setting values selectable for image quality in image capturing as the setting state. In addition, in each of the first and second embodiments, the selectable value tables T1 and T11 to T22 manage at least one of a combination of setting values selectable for the exposure state in image capturing as the setting state and a combination of setting values selectable for the image quality in image capturing as the setting state.

Although in the above description, an example is described in which the selectable value tables T11 to T21 of various adjustment items, that is, control parameters are changed in accordance with the change in the photo style, such two types of events, in which the selectable value table for one type is changed in accordance with a change in another type, are not limited to this example.

FIG. 16 is a diagram for illustrating other selectable value tables T31 to T33 in the present embodiment. Each of the selectable value tables T31 to T33 stores a setting value of selectable image quality in a capturing mode of moving image in a recording format different from each other. Each setting value of the image quality is set by a combination of resolution, a frame rate, and the like of the moving image. As shown in FIG. 16, the selectable value tables T31 to T33 may manage not only the availability flag, but also the selectable value itself for each capturing mode, for example.

In addition to the example in FIG. 16, the selectable value table may be changed for each of the ISO value, a plurality of operation modes related to AF control, and a setting value in exposure setting according to various capturing modes of the digital camera 100, for example. For example, these selectable value tables may be changed according to whether the capturing mode selected in the digital camera 100 is a mode for mainly capturing a still image or a mode for capturing a moving image.

In addition, for example, a selectable photo style may be changed according to whether a capturing mode of the digital camera 100 is a capturing mode in which a capturing setting can be adjusted by a user or an automatic mode in which a capturing scene is automatically determined. In this case, the selectable value table of the adjustment item in each photo style may also be changed according to each capturing mode or the like described above.

In addition, in the present embodiment, the digital camera 100 may include a body mount to which various interchangeable lenses can be attached, and a range in which the aperture value can be set may be managed by a selectable value table according to a model or the like of the interchangeable lens to be attached, and the table may be changed. The digital camera 100 can transmit and receive various kinds of data indicating a model or the like of the lens to and from the interchangeable lens via the body mount, for example.

The digital camera 100 can notify the PC 200 also of the various selectable value tables as described above, including the necessity of acquiring the selectable value table by the table acquisition flag of the notification data D2 according to the event as in the first embodiment, for example.

Other Embodiments

As described above, the first and second embodiments are described as an example of the technology in the present disclosure. To this extent, the attached drawings and detailed descriptions are provided. However, the technique of the present disclosure is not limited thereto and is also applicable to embodiments obtained by appropriately performing changes, replacements, additions, omissions, and the like. In addition, it is possible to combine the respective constituent elements described in the above-described embodiments to obtain a new embodiment.

The first and second embodiments describe an example of generating the notification data D2 with the table acquisition flag enabled for the event corresponding to the camera state in which the selectable value table T1 and the like are changed (S53). In the present embodiment, for example, the table acquisition flag in the notification data D2 may be enabled for an event different from the event in which the selectable value table T1 or the like is changed. For example, when the selectable value table T1 of the ISO value is changed by changing the ISO sensitivity step as in the first embodiment, a table acquisition flag indicating that it is necessary to acquire the selectable value table T1 for the ISO value may be stored in the notification data D2 of the ISO sensitivity step.

In addition, for example, by a change in the photo style as shown in the second embodiment, the selectable value tables T11 to T21 and the like may be changed for a plurality of types of camera states. In this case, in the present embodiment, the digital camera 100 may manage, by a list or the like, a plurality of table acquisition flags respectively corresponding to the plurality of types of camera states in the notification data D2, for example.

In each of the above embodiments, an example is described in which the event notification is performed with the notification data D2 illustrated in FIG. 8 storing the changed value of the camera state in the occurring event. The notification data for the event notification is not limited to the example in FIG. 8. For example, in the present embodiment, the changed value is not particularly stored, and only the tag ID and the table acquisition flag of the occurring event may be stored. In this case, for example, similarly to the acquisition request (S412) and the acquisition response (S413) of the ISO information in FIG. 6, the digital camera 100 may transmit the changed value in response to the request from the PC 200 that received the event notification. Even in this case, for example, by enabling or disabling the table acquisition flag according to the event, it is possible to suppress the processing acquiring the selectable value table every time the event occurs and to reduce the communication load between the digital camera 100 and the PC 200.

In each of the above embodiments, an example is described in which communication between the digital camera 100 and the PC 200 is performed by connection between the USB connector 155 and the device I/F 255 conforming to the USB standard. The communication between the digital camera 100 and the PC 200 is not limited to the communication in the USB standard, and can be realized by using various communication standards. In the present embodiment, not only the USB connector 155 and the device I/F 255 but also, the Wi-Fi module 165 and the network I/F 265 may perform communication conforming to IEEE 802.3, the Wi-Fi standard, or the like, for example. Furthermore, the communication between the digital camera 100 and the PC 200 may be realized by connecting the USB connector 155 and the network I/F 265 via a USB-LAN adapter, for example.

In addition, in each of the above embodiments, the notification data D2 including three parameters is described. However, in the present embodiment, the notification data for the event notification may include four or more parameters. For example, other parameters may be included in addition to the three parameters in the data structure similar to that of the notification data D2 shown in FIG. 8.

In each of the above embodiments, an example is described in which communication is performed between one digital camera 100 and the PC 200 in the imaging system 1. In the present embodiment, in the imaging system, communication may be performed between a plurality of digital cameras and the PC 200. In this case, when events in the respective digital cameras are notified to the PC 200 and the acquisition for the event is performed, the processing load may further increase in the controller 235 of the PC 200. Even in such a case, for example, the processing load of the PC 200 can be reduced by performing the event notification between each digital camera and the PC 200 using the data structure of the notification data similar to that in each of the above embodiments.

In each of the above embodiments, the digital camera 100 and the PC 200 are described respectively as an example of the communication device and an example of the control device. In the present embodiment, the communication device and the control device are not limited thereto, and may be various electronic apparatuses having a communication function capable of performing data communication with each other. For example, the communication device may be a video camera, and the control device may be a smartphone or a tablet terminal. In addition, the communication device and the control device may be the same type of electronic apparatuses. The present disclosure is applicable not only to an imaging apparatus having an imaging function but also to various communication devices that notify an external control device of information managed in the communication devices.

In each of the above embodiments, the digital camera 100 is described as an example of the imaging apparatus. In the present embodiment, the imaging apparatus is not limited to the digital camera, and may be an electronic device having an image capturing function and a communication function. For example, the imaging apparatus may be configured as a video camera, a smartphone, a tablet computer, or the like.

As described above, the above-described embodiments are described as examples of techniques in the present disclosure. To this extent, the attached drawings and detailed descriptions are provided. Therefore, components described in the attached drawings and the detailed description include not only components indispensable to solve the problem, but may also include components not necessarily indispensable to solve the problem in order to provide examples of the techniques. Therefore, those components not necessarily indispensable should not be deemed essential due to the mere fact that those components not necessarily indispensable are described in the attached drawings and the detailed description.

Aspects of Present Disclosure

According to a first aspect of the present disclosure, a communication device that notifies an external control device of information managed in the communication device is provided. The communication device according to the first aspect includes: a communication circuitry configured to perform data communication with the control device; and a control circuitry configured to generate notification data in response to an event and control the communication circuitry to transmit the notification data to the control device, the event indicating that a state in the communication device changes. The notification data includes: an event identification region to identify a target event to be notified, a data storage region to store state data indicating a state changed in the target event, and a necessity identification region to indicate whether the control device requires acquiring additional information regarding the target event.

According to a second aspect of the present disclosure, in the communication device of the first aspect, the additional information includes a management table managing a combination of options each selectable as the state data of the target event.

According to a third aspect of the present disclosure, in the communication device of the second aspect, the control circuitry controls the necessity identification region according to whether the target event is a first event or a second event, the first event changing the state data among the combination of options in the management table, the second event changing the combination of options in the management table.

According to a fourth aspect of the present disclosure, in the communication device of the third aspect, when the first event and the second event occur successively, the control circuitry generates each notification data such that the necessity identification region indicates, in one of the notification data for the first event and the notification data for the second event, that acquiring the additional information is required.

According to a fifth aspect of the present disclosure, in the communication device according to any one of the second to fourth aspects, the communication device constitutes an imaging apparatus configured to capture an image to generate image data. The event indicates a change in a setting state for image capturing in the imaging apparatus. The options each corresponds to a setting value selectable for the setting state in the imaging apparatus.

According to a sixth aspect of the present disclosure, in the communication device of the fifth aspect, the management table manages at least one of a combination of setting values selectable for an exposure state in image capturing as the setting state and a combination of setting values selectable for image quality in image capturing as the setting state.

According to a seventh aspect of the present disclosure, in the communication device according to the fifth aspect or the sixth aspect, the control circuitry is configured to control the communication circuitry to perform data communication with the control device in accordance with a Picture Transfer Protocol (PTP).

According to an eighth aspect of the present disclosure, a control device configured to be notified of information from an external communication device is provided. The control device according to the eighth aspect includes: a communication circuitry configured to perform data communication with the communication device; and a control circuitry configured to control an operation to receive notification data from the communication device via the communication circuitry in response to an event indicating that a state in the communication device changes. The notification data includes an event identification region to identify a target event to be notified, a data storage region to store state data indicating a state changed in the target event, and a necessity identification region to indicate whether the control device requires acquiring additional information regarding the target event. When receiving, from the communication device via the communication circuitry, the notification data with the necessity identification region indicating that the control device requires acquiring the additional information, the control circuitry requests the additional information from the communication device. When receiving, via the communication circuitry, the notification data with the necessity identification region indicating that the control device does not require acquiring the additional information, the control circuitry does not request the additional information from the communication device The present disclosure is applicable to a communication device and a control device capable of performing data communication with each other.

What is claimed is:

1. A control device configured to be notified of information from an external communication device, the control device comprising:
   a communication circuitry configured to perform data communication with the external communication device; and
   a control circuitry configured to control an operation to receive notification data from the external communication device via the communication circuitry in response to an event indicating that a state in the external communication device changes, wherein
   the notification data includes an event identification region to identify a target event to be notified, a data storage region to store state data indicating a state changed in the target event, and a necessity identification region to indicate whether the control device requires acquiring additional information regarding the target event, and wherein
   when receiving, from the external communication device via the communication circuitry, the notification data with the necessity identification region indicating that the control device requires acquiring the additional information, the control circuitry requests the additional information from the external communication device, and
   when receiving, via the communication circuitry, the notification data with the necessity identification region indicating that the control device does not require acquiring the additional information, the control circuitry does not request the additional information from the external communication device.

2. A communication device configured to notify an external control device of information managed in the communication device, the communication device comprising: a communication circuitry configured to perform data communication with the external control device; and a control circuitry configured to generate notification data in response to an event and control the communication circuitry to transmit the notification data to the external control device, the event indicating that a state in the communication device changes, wherein the notification data includes: an event identification region to identify a target event to be notified; a data storage region to store state data indicating a state changed in the target event; and a necessity identification region to indicate whether the external control device requires acquiring additional information regarding the target event, and wherein the necessity identification region included in the notification data indicates whether the external control device requires requesting the additional information on the target event from the communication device.

3. The communication device according to claim 2, wherein the additional information includes a management table managing a combination of options each selectable as the state data of the target event.

4. The communication device according to claim 3, wherein the control circuitry is configured to control the necessity identification region according to whether the target event is a first event or a second event, the first event changing the state data among the combination of options in the management table, the second event changing the combination of options in the management table.

5. The communication device according to claim 4, wherein when the first event and the second event occur successively, the control circuitry generates each notification data such that the necessity identification region indicates, in one of the notification data for the first event and the notification data for the second event, that acquiring the additional information is required.

6. The communication device according to claim 3, wherein the communication device constitutes an imaging apparatus configured to capture an image to generate image data, the event indicates a change in a setting state for image capturing in the imaging apparatus, and the options each corresponds to a setting value selectable for the setting state in the imaging apparatus.

7. The communication device according to claim 6, wherein the management table manages at least one of a combination of setting values selectable for an exposure state in image capturing as the setting state or a combination of setting values selectable for image quality in image capturing as the setting state.

8. The communication device according to claim 6, wherein the control circuitry is configured to control the communication circuitry to perform data communication with the external control device in accordance with Picture Transfer Protocol (PTP).

* * * * *